US012509643B2

(12) United States Patent
Natoli et al.

(10) Patent No.: US 12,509,643 B2
(45) Date of Patent: Dec. 30, 2025

(54) PRO-BENEFIT-AGENT COMPOUNDS WITH CARBON/NITROGEN BONDS

(71) Applicant: The Procter & Gamble Company, Cincinnati, OH (US)

(72) Inventors: Sean N. Natoli, Liberty Township, OH (US); Rajan Keshav Panandiker, West Chester, OH (US); Gregory Scot Miracle, Liberty Township, OH (US); Jenna Marie Hoover, Finneytown, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 852 days.

(21) Appl. No.: 17/751,755

(22) Filed: May 24, 2022

(65) Prior Publication Data

US 2022/0403297 A1    Dec. 22, 2022

Related U.S. Application Data

(60) Provisional application No. 63/255,969, filed on Oct. 15, 2021.

(30) Foreign Application Priority Data

May 26, 2021    (EP) ..................... 21175862

(51) Int. Cl.
| | | |
|---|---|---|
| C11D 3/33 | (2006.01) | |
| C11D 1/655 | (2006.01) | |
| C11D 3/00 | (2006.01) | |
| C11D 3/50 | (2006.01) | |

(52) U.S. Cl.
CPC .............. *C11D 3/33* (2013.01); *C11D 1/655* (2013.01); *C11D 3/0015* (2013.01); *C11D 3/505* (2013.01)

(58) Field of Classification Search
USPC ........................................................ 512/12
See application file for complete search history.

(56) References Cited

U.S. PATENT DOCUMENTS

| | | |
|---|---|---|
| 5,204,023 A | 4/1993 | Behan et al. |
| 6,861,402 B1 | 3/2005 | Miracle et al. |
| 7,018,978 B2 | 3/2006 | Miracle et al. |
| 7,867,961 B2 | 1/2011 | Tobita |
| 8,287,844 B2 | 10/2012 | Burgo |
| 9,326,928 B2 | 5/2016 | Tong et al. |
| 10,552,557 B2 | 2/2020 | Frankenbach et al. |
| 2003/0211963 A1 | 11/2003 | Bettiol et al. |
| 2009/0275630 A1 | 11/2009 | Provost et al. |
| 2018/0193233 A1 | 7/2018 | Burgo |
| 2020/0239811 A1 | 7/2020 | Burgo |
| 2020/0368164 A1 | 11/2020 | Becker et al. |
| 2023/0002330 A1* | 1/2023 | Natoli ................. C07D 263/04 |
| 2023/0220300 A1 | 7/2023 | Natoli et al. |
| 2023/0220304 A1 | 7/2023 | Natoli et al. |

FOREIGN PATENT DOCUMENTS

| | | |
|---|---|---|
| CN | 102766058 A | 11/2012 |
| CN | 106436323 A | 2/2017 |
| CN | 109912811 B | 4/2021 |
| EP | 0206729 A2 | 12/1986 |
| EP | 0310299 A1 | 4/1989 |
| EP | 0392619 A2 | 10/1990 |
| JP | S59212458 A | 12/1984 |
| JP | 2004010553 A | 1/2004 |
| JP | 2019150783 A | 9/2019 |
| JP | 2020083844 A | 6/2020 |
| WO | 9927049 A1 | 6/1999 |
| WO | 0072816 A1 | 12/2000 |
| WO | 200127234 A1 | 4/2001 |
| WO | 0238120 A1 | 5/2002 |
| WO | 03033635 A1 | 4/2003 |
| WO | 2007082026 A2 | 7/2007 |
| WO | 2010093615 A2 | 8/2010 |
| WO | 2012132022 A1 | 10/2012 |
| WO | 2013150044 A2 | 10/2013 |
| WO | 2019079313 A1 | 4/2019 |
| WO | 2020090658 A1 | 5/2020 |
| WO | 2020188079 A1 | 9/2020 |
| WO | 2020224767 A1 | 11/2020 |
| WO | 2020260598 A1 | 12/2020 |

OTHER PUBLICATIONS

16050M PCT Search Report and Written Opinion for PCT/US2022/072516 dated Sep. 15, 2022, 11 pages.
16050F EP Search Report and Written Opinion for 21175862.8 dated Jan. 10, 2022, 7 pages.
All Office Actions; U.S. Appl. No. 17/751,763, filed May 24, 2022.
Database CA [Online] Chemical Abstracts Service, Columbus, Ohio, US; 1990, Hedegus, Louis S. et al.: "Photolytic reactions of chromium aminocarbene complexes. Conversion of amides to alpha-amino-acids", XP002804409, Journal of the American Chemical Society, vol. 112, No. 6, 1990, pp. 3.
Database CA [Online] Chemical Abstracts Service, Columbus, Ohio, US; Bezencon, Oliver et al: "Alkylations of chiral imidazolidinones derived from di- and triglycine and attempts at cyclizations to give cycloisodityrosines", XP002804411, Liebigs Annalen , (8), 1259-1276 Coden: Lanaem; ISSN: 0947-3440, 1996.
Database CA [Online] Chemical Abstracts Service, Columbus, Ohio, US; Coulton, Steven et al: "Synthesis of novel 2-oxo-4-thia-1-azabicyclo[3.3. O]oct-7-ene-8-carboxylic acid derivatives.", XP002804410, Journal of the Chemical Society, Perkin Transactions 1: Organic and Bio-Organic Chemistry, 1972-1999, pp. 4.

(Continued)

*Primary Examiner* — Jessica Whiteley
(74) *Attorney, Agent, or Firm* — Carolyn S. Powell

(57) ABSTRACT

Pro-benefit-agent compounds that include a benefit agent fragment joined to a hydrophobically modified core, such as a hydrophobically modified amino acid, by a carbon/nitrogen linking bond, where the fragment is derived from a benefit agent, such as a perfume raw material, that includes an aldehyde moiety or a ketone moiety. Related treatment compositions, premix compositions, and methods of making and using such compositions.

21 Claims, No Drawings

(56) References Cited

OTHER PUBLICATIONS

Database CA [Online] Chemical Abstracts Service, Columbus, Ohio, US; Gaisina, Karina R. et al: "Non-pericyclic cycloaddition of gemdifluorosubstituted azomethine ylides to the C=O bond: computational study and synthesis of fluorinated oxazole derivatives", XP002804414, Organic & Biomolecular Chemistry, 15(21), 4579-4586 Coden: Obcrak; ISSN: 1477-0520, 2017.

Database CA [Online] Chemical Abstracts Service, Columbus, Ohio, US; Iwanowicz, Edwin J. et al: "The enantioselective synthesis of anti-.beta.-hydroxy .alpha.-amino acids via the reaction of lithium enolates of glycine bearing an oxazolidine chiral auxiliary with aldehydes", XP002804413, Synlett, (6), 664-666 Coden: Synles; ISSN: 0936-5214, 1998.

Database CA [Online] Chemical Abstracts Service, Columbus, Ohio, US; Panek, James S. et al: "An Improved Synthesis of (4S,5S)-2-Phenyl-4-(methoxycarbonyl)-5- isopropyloxazoline from (S)-Phenylglycinol", XP002804412, Journal of Organic Chemistry, 63(7), 2382-2384 Coden:Joceah; ISSN: 0022-3263, 1998.

Database CA [Online] Chemical Abstracts Service, Columbus, Ohio, US; Polt, Robin et al: "Stereoselective alkylation of glycine units in dipeptide derivatives. "Chirality transfer" via a pivalaldehyde N,N-acetalcenter", XP002804408, Journal of the American Chemical Society, vol. 111, No. 7, 1989,—1989, pp. 4.

Kuhnt Tobias et al: "Controlled fragrance release from galactosebased pro-fragrances", Rsc Adv., vol. 4, No. 92, Jan. 1, 2014 (Jan. 1, 2014), pp. 50882-50890, XP055849079.Retrieved from the Internet:URL :https ://pubs. rsc. org/en/content/articlepdf /2014/ra/ c4ra07728h.

Unpublished U.S. Appl. No. 17/751,763, filed May 24, 2022, to Sean N. Natoli et al.

Andreas Herrmann, "Controlled Release of Volatiles under Mild Reaction Conditions: From Nature to Everyday Products", vol. 46, 2007, pp. 5836-5863.

Pinazo et al. "Amino acid-based surfactants: New antimicrobial agents", Advances in Colloid and Interface Science, Dec. 15, 2015, pp. 17-39.

Pérez et al. "Gemini surfactants from natural amino acids", Advances in Colloid and Interface Science, Oct. 24, 2013, pp. 134-155.

Qing-Yi et al. "The antimicrobial activities of the cinnamaldehyde adducts with amino acids", International Journal of Food Microbiology, Aug. 4, 2011, pp. 164-170.

Tripathy et al., "Synthesis, chemistry, physicochemical properties and industrial applications of amino acid surfactants: A review", Comptes Rendus Chimie, Feb. 3, 2018, pp. 112-130.

* cited by examiner

PRO-BENEFIT-AGENT COMPOUNDS WITH CARBON/NITROGEN BONDS

FIELD OF THE INVENTION

The present disclosure relates to certain pro-benefit-agent compounds having carbon/nitrogen bonds, related treatment compositions, and methods of making and using such compositions. The pro-benefit-agent compounds may be derived from hydrophobically-modified amino acids.

BACKGROUND OF THE INVENTION

Manufacturers of treatment compositions are continuously seeking ways to improve the delivery efficiency and/or performance benefits associated with certain benefit agents. The use of pro-benefit-agent compounds, in which a benefit agent fragment is joined by a cleavable or hydrolysable bond to a carrier or precursor molecule and then released when the bond breaks, can be a useful strategy. For example, certain amine compounds may be the basis of pro-perfume or pro-fragrance technologies. However, there remains room for improvement with regard to stability and/or deposition profiles.

Furthermore, consumers may desire materials that are associated with desirable environmental or sustainability profiles.

There is a need for pro-benefit-agent compounds that provide improved delivery, release, and/or stability profiles, as well as treatment compositions that include such compounds. There is also a need for methods of making and using such treatment compositions.

SUMMARY OF THE INVENTION

The present disclosure relates to pro-benefit-agent compounds that include carbon-nitrogen bonds and hydrophobic moieties.

For example, the present disclosure relates to a pro-benefit-agent compound, where the compound includes: a carbon-containing core, the carbon-containing core includes a carbon backbone, one or more side groups, a nitrogen atom, and a carbonyl group, where the carbonyl group is part of a carbonyl-containing moiety that is selected from an ester moiety, an amide moiety, or a thioester moiety, where the carbonyl-containing moiety includes a heteroatom joined to the carbon of the carbonyl group, where the heteroatom is selected from oxygen, nitrogen, or sulfur, where the carbonyl-containing moiety further includes a hydrophobic moiety joined to the heteroatom, where the hydrophobic moiety is an organic group that includes 5 to 34 chain atoms, preferably carbon chain atoms; and a benefit agent fragment joined to the core by a linking bond that is a single bond or a double bond, the linking bond being between the nitrogen atom of the carbon-containing core and a carbon atom of the benefit agent fragment, the single bond, if present, having been formed by a 1,4-addition process, the double bond, if present, being part of an imine bond, where when the linking bond cleaves, a benefit agent is released, the benefit agent comprising an aldehyde moiety, a ketone moiety, or combinations thereof. The pro-benefit-agent compound is preferably derived from a hydrophobically modified amino acid.

The present disclosure also relates to a pro-benefit-agent compound, wherein the compound comprises: a carbon-containing core, the carbon-containing core comprising a carbon backbone, one or more side groups, a nitrogen atom, and a carbonyl group, wherein the carbonyl group is part of a carbonyl-containing moiety that is an amide moiety, wherein the carbonyl-containing moiety comprises a heteroatom joined to the carbon of the carbonyl group, wherein the heteroatom is nitrogen, wherein the carbonyl-containing moiety further comprises one or two hydrophobic moieties joined to the heteroatom, wherein the one or two hydrophobic moieties are organic groups, wherein the total number of chain atoms in the one or two hydrophobic moieties (e.g., the number of chain atoms in a first hydrophobic moiety added to the number of chain atoms in a second hydrophobic moiety, if present) is from 5 to 34, preferably wherein the chain atoms are carbon atoms or a mixture of carbon and oxygen atoms that form at least one alkoxylate group, more preferably wherein the chain atoms are carbon atoms; a benefit agent fragment joined to the core by a linking bond that is a single bond or a double bond, the linking bond being between the nitrogen atom of the carbon-containing core and a carbon atom of the benefit agent fragment, the single bond, if present, having been formed by a 1,4-addition process, the double bond, if present, being part of an imine bond, wherein when the linking bond cleaves, a benefit agent is released, the benefit agent comprising an aldehyde moiety, a ketone moiety, or combinations thereof.

The present disclosure also relates to treatment compositions that include an adjunct ingredient and a pro-benefit-agent compound as described above.

The present disclosure also relates to a premix composition that includes: a pro-benefit-agent precursor compound, wherein the precursor compound includes a carbon-containing core, the carbon-containing core including a carbon backbone, one or more side groups, a nitrogen atom (preferably a primary amine group), and a carbonyl group, where the carbonyl group is part of a carbonyl-containing moiety that is selected from an ester moiety, an amide moiety, or a thioester moiety, where the carbonyl-containing moiety include a heteroatom joined to the carbon of the carbonyl group, where the heteroatom is selected from oxygen, nitrogen, or sulfur, where the carbonyl-containing moiety further includes a hydrophobic moiety joined to the heteroatom, where the hydrophobic moiety is an organic group comprising 5 to 34 chain atoms; and a benefit agent, the benefit agent having an aldehyde moiety, a ketone moiety, or combinations thereof. The pro-benefit-agent precursor and the benefit agent may optionally react to form a pro-benefit agent compound as described above. In the premix composition, the sum of the weight percents of the pro-benefit-agent precursor, the benefit agent, and the pro-benefit-agent compound, if present, may be from about 10% to about 100%, by weight of the premix composition.

The present disclosure also relates to methods of making treatment compositions as described above. The method may include at least one of the following: (a) combining a pro-benefit-agent compound with an adjunct ingredient, preferably wherein the adjunct ingredient is part of a base composition; (b) combining a premix composition as described above with an adjunct ingredient, preferably where the adjunct ingredient is part of a base composition; (c) combining a pro-benefit-agent precursor compound, a benefit agent, and an adjunct ingredient, preferably wherein the adjunct ingredient is part of a base composition and the pro-benefit-agent precursor compound and the benefit agent are each added to the base composition as separate inputs.

The present disclosure also relates to methods of treating an article or a surface, where the method comprises treating the article or surface with a treatment composition according to the present disclosure, optionally in the presence of water, and optionally further includes the step of rinsing and/or drying.

DETAILED DESCRIPTION OF THE INVENTION

The present disclosure relates to pro-benefit-agent compounds, which may be derived from modified amino acids. The compounds may include a fragment or residue of a benefit agent, such as a perfume raw material or an antimicrobial agent, that includes an aldehyde or ketone moiety. In the pro-benefit-agent compounds of the present disclosure, the benefit agent fragment or residue is joined to the nitrogen atom of the modified amino acid by a linking bond that is a carbon/nitrogen bond, such as an imine bond or a bond formed via a 1,4-addition process. Without wishing to be bound by theory, it is believed that when the linking bond breaks (e.g., via hydrolysis or reversion), the benefit agent is released.

Furthermore, the modified amino acid comprises an organic group attached to the acid end of the amino acid, thereby forming a carbonyl-containing group, which may be selected from an ester group, an amide group, or a thioester group. The organic group may be selected to increase the overall hydrophobicity of the resulting compound, which is believed to improve the delivery and/or deposition of the pro-benefit-agent compound to an intended target surface or article.

Such pro-benefit-agent compounds, related treatment compositions, and related methods are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As used herein, the phrase "chain atoms" means the sum of all atoms in an indicated group or moiety, excluding hydrogen atoms. The chain atoms may be in a linear configuration, a branched configuration, and/or a ring configuration.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Pro-Benefit-Agent Compounds

The present disclosure relates to pro-benefit-agent compounds. The pro-benefit-agent compounds include a fragment (for example, a residue) of a benefit agent. The benefit agent comprises an oxygen-containing moiety, namely an aldehyde moiety or a ketone moiety.

The benefit agent fragment, which preferably is a first benefit agent fragment, is attached to a nitrogen atom of a carrier molecule (e.g., a precursor compound) by a carbon/nitrogen linking bond. The linking bond may be a single bond that is formed by a 1,4-addition process. The linking bond may be a double bond that is part of an imine bond. When the carbon/nitrogen bond breaks (e.g., through hydrolysis), the benefit agent is released. The release of the benefit agent may be triggered by any suitable mechanism, such as the presence of water or heat, preferably water, particularly when the linking bond is an imine bond.

The pro-benefit-agent compounds of the present disclosure may be derived from amino acids that have been modified. Proteinogenic amino acids may be a preferred starting material, as such compounds are attractive for environmental or sustainability reasons, as they tend to be naturally occurring. For most naturally-occurring amino acids, the stereogenic carbon alpha to the amino group has the L-configuration. D-Amino acids are occasionally found in nature. While either L- or D-Amino acids as well as mixtures may be used, economic factors may lead to a preference for the more abundant L-Amino acids. Relatedly, biosynthesized amino acids may be preferred.

The starting amino acids may be hydrophobically modified by reacting the carboxylic acid group of the amino acid (a) with an alcohol of an organic group via an esterification reaction, (b) with an amine of an organic group via an amidation reaction, or (c) with a thiol group of an organic group via a thioesterification reaction. Such reactions can result in ester, amide, or thioester linking groups, respectively. Such linking groups, each of which is a type of carbonyl-containing moiety group, may be preferred compared to others for ease of reaction. Compounds formed with such carbonyl-containing moieties may even be preferred for environmental reasons, as these types of groups may break (e.g., hydrolyze) over time and/or in the presence of water, leaving the core material to revert, for example, to a common amino acid.

The present disclosure relates to a pro-benefit-agent compound, where the compound comprises: a carbon-containing core, the carbon-containing core comprising a carbon backbone, one or more side groups, a nitrogen atom, and a carbonyl group, wherein the carbonyl group is part of a carbonyl-containing moiety that is selected from an ester moiety, an amide moiety, or a thioester moiety, wherein the carbonyl-containing moiety comprises a heteroatom joined to the carbon of the carbonyl group, wherein the heteroatom is selected from oxygen, nitrogen, or sulfur, wherein the carbonyl-containing moiety further comprises a hydrophobic moiety joined to the heteroatom, wherein the hydrophobic moiety is an organic group comprising 5 to 34 chain atoms; a benefit agent fragment joined to the core by a linking bond that is a single bond or a double bond, the linking bond being located between the nitrogen atom of the carbon-containing core and a carbon atom of the benefit agent fragment, the single bond, if present, having been formed by a 1,4-addition process, the double bond, if present, being part of an imine bond, wherein when the linking bond cleaves (e.g., breaks, which may in some cases be by hydrolysis), a benefit agent is released, the benefit agent comprising an aldehyde moiety, a ketone moiety, or combinations thereof.

The carbon-containing core comprises a carbon backbone. The carbon backbone is understood to not include the carbons of the carbonyl-containing moiety or the side group (s), if any. The carbon backbone may comprise from one to six carbon atoms, preferably from one to three carbon atoms, more preferably one carbon atom. Relatively fewer carbon atoms may be preferred for mass-efficiency reasons. In particular, backbones comprising only one carbon atom may be preferred because such structures are indicative of naturally-occurring, proteinogenic amino acids.

The carbon-containing core may be derived from an amino acid. Preferably, the core is derived from a proteinogenic amino acid. In particular, naturally-derived or biosynthesized amino acids may be preferred. Such materials may be preferred for environmental/sustainability reasons, and because they tend to be readily available at reasonable costs.

The at least one side group may be selected from a hydrogen or a suitable organic group, preferably hydrogen or an organic group having from one to about twenty chain atoms, preferably carbon atoms. The at least one side group may comprise one or more functional groups, such as carboxyl groups, amine groups, thiol groups, or hydroxyl groups. The at least one side group may be linear or branched. The at least one side group may comprise an aryl ring. The compound preferably may comprise only one non-hydrogen side group (e.g., only one organic group). The compound may comprise more than one non-hydrogen side group. The at least one side group preferably comprises the side group of a proteinogenic amino acid. The carbon-containing core may comprise at least one side group that is a hydrogen, and at least one side group that is an organic group. All of the side groups may be hydrogen, for example when the core is based on or otherwise derived from glycine.

The side group may have the structure of a side group of a proteinogenic amino acid or a derivative thereof, preferably the side group of a proteinogenic amino acid selected from the group consisting of valine, phenylalanine, leucine, isoleucine, a derivative thereof, or combinations thereof, more preferably valine, phenylalanine, a derivative thereof, or combinations thereof. Derivatives thereof may include substitutions, including benefit agent fragments being bonded to the side group derivative.

The at least one side group may comprise a member having a structure selected from the following group, where "#" represents where the side group is attached to a carbon atom of the carbon-containing core:

| Structure | Description of Structure |
|---|---|
| # | Side group of valine |
| # | Side group of phenylalanine |
| # | Side group of leucine |
| # | Side group of isoleucine |

When the carbon-containing core comprises a side group having a structure that is the side group of a proteinogenic acid, preferably a side group selected from the table above, it may be preferred that the remaining side groups are hydrogen.

It may be preferred that the carbon-containing core (e.g., the parent amino acid) contains a relatively hydrophobic side group, for example those that do not contain a hydrophilic functional group, such as a carboxy group. It is believed that relatively hydrophobic side groups facilitate deposition of the pro-benefit-agent compound onto a target surface, particularly when the compound is delivered in an aqueous solution, such as a laundry wash liquor.

The proteinogenic amino acid from which the carbon-containing core is derived may be selected from the group consisting of valine, phenylalanine, leucine, isoleucine, or combinations thereof, preferably valine, phenylalanine, or combinations thereof. It has been found that such pro-benefit-agent compounds derived from these amino acids are particularly effective at delivering the benefit agent, particularly perfume raw materials, more particularly in laundry applications.

The pro-benefit-agent compounds of the present disclosure comprise a hydrophobic moiety (sometimes referred to herein as simply a "hydrophobe"). As used in this context, "hydrophobic" is meant to describe an organic group having a logP of at least 1.3, where the logP is determined for the parent alcohol of the organic group, regardless of whether the organic group is derived from an alcohol, an amine, or a thiol. For example, if the hydrophobic moiety is a linear group having eight carbons and is attached to the heteroatom of the carbonyl-containing moiety at a terminal position of the hydrophobe, the logP is determined according to the logP value for 1-Octanol (in this case, logP=approx. 3.0), regardless of whether the hydrophobic moiety is joined to the core via an ester bond, an amide bond, or a thioester bond (see table A below). The hydrophobic moiety (e.g., the Q group, as described below) may be characterized by a logP of at least 1.3, or from about 2.8 to about 10.8, or from about 3.0 to about 7.8, or from about 5.0 to about 6.9. The hydrophobic moiety (e.g., the parent alcohol of the hydrophobic moiety/Q) may preferably be characterized by a logP of from about 1.6 to about 10, preferably from about 2 to about 8, more preferably from about 2.5 to about 8, even more preferably from about 2.5 to about 5.

The method for determining logP is found in the Test Methods section below.

TABLE A

Calculated$^a$ LogP values of potential alcohol Q groups

| Compound Name | Smiles Code | Calculated$^a$ LogP Value |
|---|---|---|
| 1-Hexanol | CCCCCCO | 1.916 |
| 1-Octanol | CCCCCCCCO | 2.992 |
| 1-Decanol | CCCCCCCCCCO | 4.329 |
| 1-Dodecanol | CCCCCCCCCCCCO | 5.0 |
| 1-Tetradecanol | CCCCCCCCCCCCCCO | 6.206 |
| 1-Hexadecanol | CCCCCCCCCCCCCCCCO | 6.889 |
| 1-Octadecanol | CCCCCCCCCCCCCCCCCCO | 7.781 |

$^a$The logP of an individual material is determined using the Consensus logP Computational Model, version 14.5 (Linux) available from Advanced Chemistry Development Inc. (ACD/Labs) (Toronto, Canada).

As described above, the hydrophobic moiety can be joined to the carbon-containing core by a carbonyl-containing moiety that is selected from an ester moiety, an amide moiety, or a thioester moiety. Such carbonyl-containing moieties may be formed by reacting the carboxylic acid end of the core amino acid with an appropriate functional group (e.g., an alcohol, an amine, or a thiol) of a suitable (hydrophobic) organic group. It may be preferred that the carbonyl-containing moiety that joins the hydrophobic moiety to the core is an ester moiety, for example due to the low cost of alcohol precursors or for the advantageous environmental profile of the resulting ester.

As described above, the hydrophobic moiety may be an organic group comprising 5 to 34 chain atoms, preferably carbon atoms. Without wishing to be bound by theory, it is believed that a certain minimum of chain atoms is useful for increasing the relative hydrophobicity of the group, and thus the resulting compound, which in turn can help to facilitate increased deposition or performance. The hydrophobic moiety may be an organic group comprising from about 8 to about 18 chain atoms, more preferably from about 8 to about 14 chain atoms, even more preferably where most or even all of the chain atoms are carbon atoms. It may be preferred that the chain atoms are carbon atoms or a mixture of carbon and oxygen atoms that form at least one alkoxylate group.

It may be preferred that the carbonyl-containing moiety is an amide moiety. Amide moieties may be preferred for stability reasons, and/or when the benefit agent fragment is a fragment of an anti-microbial agent. In such cases, the compound may have one or two hydrophobic moieties that are part of the carbonyl-containing moiety. Without wishing to be bound by theory, it is believed that two hydrophobic moieties, even if relatively small, can provide a suitable degree of hydrophobicity such that the compound performs as well as if it had one larger hydrophobe.

For example, the present disclosure relates to a pro-benefit-agent compound, wherein the compound comprises: a carbon-containing core, the carbon-containing core comprising a carbon backbone, one or more side groups, a nitrogen atom, and a carbonyl group, wherein the carbonyl group is part of a carbonyl-containing moiety that is an amide moiety, wherein the carbonyl-containing moiety comprises a heteroatom joined to the carbon of the carbonyl group, wherein the heteroatom is nitrogen, wherein the carbonyl-containing moiety further comprises one or two hydrophobic moieties joined to the heteroatom, wherein the one or two hydrophobic moieties are organic groups, wherein the total number of chain atoms in the one or two hydrophobic moieties (e.g., the number of chain atoms in a first hydrophobic moiety added to the number of chain atoms in a second hydrophobic moiety, if present) is from 5 to 34, preferably wherein the chain atoms are carbon atoms or a mixture of carbon and oxygen atoms that form at least one alkoxylate group, more preferably wherein the chain atoms are carbon atoms; a benefit agent fragment joined to the core by a linking bond that is a single bond or a double bond, the linking bond being between the nitrogen atom of the carbon-containing core and a carbon atom of the benefit agent fragment, the single bond, if present, having been formed by a 1,4-addition process, the double bond, if present, being part of an imine bond, wherein when the linking bond cleaves, a benefit agent is released, the benefit agent comprising an aldehyde moiety, a ketone moiety, or combinations thereof. The total number of chain atoms in the one or two hydrophobic moieties may be from about 8 to about 18 chain atoms, preferably from about 8 to about 14 chain atoms. The carbonyl-containing moiety may comprise two hydrophobic moieties joined to the heteroatom, which may be preferred for stability reasons. At least one of the two hydrophobic moieties joined to the heteroatom comprises at least three, preferably at least four chain atoms. Each of the two hydrophobic moieties joined to the heteroatom independently comprises at least 2, preferably at least three, preferably at least four chain atoms. The one or two hydrophobic moieties may independently be an unsubstituted organic group, an unbranched organic group, or a combination thereof, preferably a combination thereof.

When the benefit agent fragment is a derived from a perfume raw material, relatively greater hydrophobicity may be preferred for deposition or performance reasons; for example, when the benefit agent to be released is a perfume raw material, the organic group may comprise from about 8 to about 18, preferably from about 10 to about 18, more preferably from about 12 to about 18, even more preferably from about 12 to about 16 chain atoms, preferably where most or even all of the chain atoms are carbon atoms.

When the benefit agent fragment is a derived from an antimicrobial agent, relatively less hydrophobicity may be preferred for performance reasons; for example, when the benefit agent to be released is an antimicrobial agent, the organic group may comprise from about 6 to about 14, preferably from about 6 to about 12, preferably from about 8 to about 12, preferably more preferably from about 8 to about 10 chain atoms, preferably where the chain atoms are carbon atoms. In such cases, it may particularly preferred that the hydrophobic moiety is connected via an amide bond.

The hydrophobic moiety may be optionally substituted, although it is preferred that such substitutions are selected so as to maintain the hydrophobic character of the organic group. For example, the organic group may comprise relatively hydrophobic substitutions. Additionally or alternatively, the organic group may comprise hydrophilic substitutions, but it is preferred that they are kept to a minimum and/or that the number of chain atoms is selected accordingly to counteract some of the hydrophilicity of the substitution. For example, if the organic group comprises a hydroxyl substitution, it may be preferred that the organic group comprises at least 10, preferably at least 12, carbon atoms.

The hydrophobic moiety may be an unsubstituted organic group, an unbranched organic group, or a combination thereof. Preferably, the hydrophobic moiety is both unsubstituted and unbranched. Such moieties may be preferred because of convenient availability, performance profiles, and relatively low environmental impact. Suitable moieties may be derived from n-Octanol, n-Decanol, n-Dodecanol, and the like.

The hydrophobic moiety may be derived from a mixture of feedstock materials, such as fatty alcohols. The feedstock materials may include materials having variable chain lengths. In such cases, the chain lengths described herein for the hydrophobic moieties are understood to be weight average chain lengths.

Additionally or alternatively, the feedstock materials used to form the hydrophobic moieties may include some materials that are linear and some materials that are branched. Therefore, when the feedstocks are reacted to form the precursors or pro-benefit-agent compounds of the present disclosure, some materials will include linear monovalent moieties and others will include branched monovalent moieties. Such mixtures are contemplated in the present disclosure.

The hydrophobic moiety may comprise a second fragment of a second benefit agent, which may ultimately be released from the pro-benefit-agent compound in addition to the benefit agent joined to the nitrogen atom of the core, which may be called a first benefit agent. Such configurations may be preferred for loading efficiency reasons; two fragments may be joined to, and released from, the compound. Such configurations may also be preferred to allow for a variety of benefit agents to be released from the same compound.

For example, the second benefit agent fragment may have a different identity than the benefit agent fragment that is joined to the nitrogen of the core. Both fragments may be in the same category of benefit agents (e.g., both are derived from perfume raw materials), but they may have different identities. Preferably, the first and second benefit agents include different functional groups. For example, the first benefit agent may comprise an aldehyde or ketone moiety, and the second benefit agent may comprise a functional group that is not an aldehyde or ketone moiety. The second benefit agent may comprise a functional group that is an alcohol, an amine, a thiol, or a combination thereof.

Preferably, the second benefit agent comprises a functional group that is an alcohol group. Such alcohol-containing materials may be preferred for ease of reaction with the carboxylic acid of the amino acid core (e.g., thereby forming an ester). Such materials may also be preferred to provide a broader spectrum of materials released from the pro-benefit-agent compound (e.g., an aldehyde- or ketone-containing benefit agent, in combination with an alcohol-containing benefit agent).

The hydrophobic moiety may be substituted with a fragment of the second benefit agent. The hydrophobic moiety may be (in its entirety) a fragment of the second benefit agent.

The second benefit agent may be a perfume raw material, preferably an alcohol-containing perfume raw material. In such cases, it is preferred that the first benefit agent (e.g., the parent material of the fragment attached to the nitrogen atom of the core) is also a perfume raw material, which will allow for more efficient perfume delivery and/or a more complex olfactory experience.

For environmental reasons, it may be preferred that the hydrophobic moiety is derived from a naturally-derived material or feedstock, particularly when the carbon-containing core is derived from a naturally-occurring amino acid. Suitable naturally-derived materials or feedstocks may include natural fats and/or oils.

The hydrophobic moiety may be a monovalent moiety, e.g., a monovalent organic group. Monovalent hydrophobic moieties may be preferred for ease of reaction and/or processing reasons. In such cases, the hydrophobic moiety is attached to the heteroatom that is, in turn, joined to the carbon of the carbonyl group of the carbon-containing core (e.g., an amino acid derivative), effectively in a terminal or capping position.

As described in more detail below as Formula I, such compounds may take the form of "Z**A–Q", where Z is the benefit agent fragment, A is the carbon-containing core (e.g., the parent amino acid), and Q is the hydrophobic moiety, for example a monovalent organic group.

The pro-benefit-agent compound may be characterized by a structure according to Formula I:

$$Z**A-Q \qquad \text{Formula I}$$

wherein Z is the benefit agent fragment, preferably a first benefit agent fragment; wherein A represents the carbon-containing core; wherein ** represents the linking bond between a nitrogen atom of the A group and a carbon atom of the Z group, wherein the linking bond is either (a) a double bond, thereby forming an imine bond, or (b) a single bond formed from a 1,4-addition when the benefit agent from which the benefit agent fragment is derived comprises an alpha-beta unsaturated carbonyl-containing moiety that is an aldehyde moiety or a ketone moiety; wherein Q is the hydrophobic moiety, for example a monovalent organic group.

The pro-benefit-agent compound may be characterized by a structure according to Formula II:

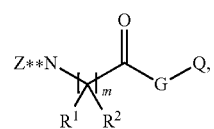

Formula II wherein G is selected from —O—, —S—, or —N($R^3$)—, preferably wherein G is —O—; wherein $R^3$, if present, is selected from —H or a monovalent moiety with a molecular weight of from about 15 to about 142 Da, preferably wherein $R^3$ is selected from —H or a monovalent moiety with a molecular weight from about 15 to about 30 Da, more preferably wherein $R^3$ is —H; wherein Q comprises 5 to 34 chain atoms, preferably from about 8 to about 18 chain atoms, more preferably from about 8 to about 14 chain atoms, most preferably wherein the chain atoms are carbon atoms; wherein $R^1$ and $R^2$ are independently selected from —H or a monovalent moiety with a molecular weight of from about 15 to about 1000 Da, preferably independently selected from —H or a monovalent moiety with a molecular weight of from about 15 to about 507 Da, more preferably independently selected from —H or a monovalent moiety with a molecular weight of from about 15 to about 142 Da;

wherein when ** represents a single bond, the nitrogen atom is further bonded to a hydrogen (—H); wherein the index m is from one to six, preferably m is from one to three, more preferably m is one.

In Formula II, G may be selected from —O—, —S—, or —N(R$^3$)—, and preferably G is —O—. The resulting ester when G is —O— may be preferred for environmental reasons, as well as convenient availability of alcohol-based feedstock materials. For clarity, the —C(O)G—moiety of Formula II represents the carbonyl-containing moiety of the carbon-containing core that is bonded to the hydrophobe (Q).

In Formula II, G may be selected from —N(R$^3$)—, wherein R$^3$ is selected from —H or a monovalent moiety with a molecular weight of from about 15 to about 142 Da, preferably wherein R$^3$ is selected from —H or a monovalent moiety with a molecular weight from about 15 to about 30 Da, more preferably wherein R$^3$ is —H. Relatively smaller R$^3$ moieties, and especially hydrogen, may be preferred when forming the amide bond, for example due to convenient reactions and availability of feedstock materials. Amides can be formed, for example, from protected or unprotected amino acids. When protected, inorganic and organic acids may be most preferred. For unprotected amino acids, chelating catalysts from group III elements, group IV elements, and transition metal catalysts may be preferred; even more preferred are catalysts containing the elements of B, Si, and Ti.

It may be preferred that the pro-benefit-agent compound is characterized by a structure according to Formula II, wherein G is —N(R$^3$)—, wherein R$^3$ is selected from —H or a monovalent moiety with a molecular weight of from about 15 to about 142 Da, preferably wherein R$^3$ is a monovalent moiety with a molecular weight of from about 15 to about 142 Da, more preferably a monovalent moiety with a molecular weight from about 15 to about 30 Da; wherein Q and R$^3$, when present, taken together comprise a total of 5 to 34 chain atoms, preferably from about 8 to about 18 chain atoms, more preferably from about 8 to about 14 chain atoms.

In Formula I or II, Q may comprise 5 to 34 chain atoms, preferably from about 8 to about 18 chain atoms, more preferably from about 8 to about 14 chain atoms, most preferably wherein the chain atoms are carbon atoms. As discussed above, such hydrophobic moieties are preferred for efficient deposition and performance benefits. The Q group may be unsubstituted, unbranched, or a combination thereof, preferably a combination thereof.

The Q group may comprise a second fragment of a second benefit agent, preferably a second perfume raw material, more preferably an alcohol-containing second perfume raw material; in such cases, G may be —O—. When such materials are present, other materials may be present that comprise the carbon-containing core and the hydrophobic moiety, but not the first benefit agent fragment that is joined to the nitrogen of the carbon-containing core.

In Formula II, R$^1$ and R$^2$ may be independently selected from —H or a monovalent moiety with a molecular weight of from about 15 to about 1000 Da, preferably independently selected from —H or a monovalent moiety with a molecular weight of from about 15 to about 507 Da, more preferably independently selected from —H or a monovalent moiety with a molecular weight of from about 15 to about 142 Da. R$^1$ and/or R$^2$ is the side group of the carbon-containing core. At least one of R$^1$ and R$^2$, preferably at least one R$^1$, is a monovalent moiety that is the side chain of a proteinogenic amino acid, preferably when R$^2$ is hydrogen (—H) and m=1.

It is possible for at least one of R$^1$ and R$^2$ to comprise a benefit agent fragment; such configurations may be preferred for mass efficiency reasons, in that one carrier comprises two fragments (one on the side chain, one on the amine group).

In Formula I or II,  represents a bond between a nitrogen atom of the core (e.g., the A group) and a carbon atom of the Z group. The  bond may be a double bond, thereby forming an imine bond (e.g., C=N—). The  bond may be a single bond that is formed from a 1,4-addition when the benefit agent from which the benefit agent fragment is derived comprises an alpha-beta unsaturated carbonyl that is an aldehyde moiety or a ketone moiety; preferably, the 1,4-addition is a Michael-type addition. When  represents a single bond, the nitrogen atom may be further bonded to a hydrogen (—H) (e.g., C—NH—).

In Formula II, index m is from one to six, preferably m is from one to three, more preferably m is one. When m is one, the carbon-containing core may be a naturally-derived or biosynthesized proteinogenic amino acid, which may be preferred for environmental reasons.

In Formula I or II, the Z group is where a benefit agent fragment (Z) is bonded by a linking bond () to the nitrogen atom of the carbon-containing core. As discussed above, the ** linking bond may be a single or a double bond. Preferably, the Z moiety comprises from about 4 to about 34 carbon atoms. The Z moiety is preferably a fragment of a perfume raw material. Benefit agents and fragments thereof are discussed in more detail below.

When the ** linking bond is a double bond (e.g., forming an imine bond), the Z group may be represented by the following structure.

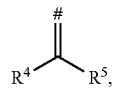

where # represents the point of attachment of the linking bond to the nitrogen atom of the carbon-containing core, where R$^4$ is selected from a monovalent organic moiety, and where R$^5$ is selected from the group consisting of hydrogen and a monovalent organic moiety, with the proviso that R$^4$ and R$^5$ may combine to form a cyclic divalent moiety. When the Z group is a fragment of an aldehyde-containing benefit agent, R$^5$ is a hydrogen. When the Z group is a fragment of a ketone-containing benefit agent, R$^5$ is an organic moiety. Such fragments may be derived from and/or result in the release of benefit agents according to the formula R$^4$—C(O)—R$^5$. The benefit agents, and fragments thereof, may be characterized by a relatively low molecular weight, for example from about 100 g/mol to about 1000 g/mol, preferably from about 100 g/mol to about 500 g/mol; R$^4$ and R$^5$ groups may be selected accordingly.

When the ** linking bond is a single bond, the Z group may be represented by the following structure:

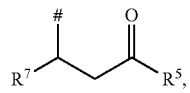

where # represents the point of attachment of the linking bond to the nitrogen atom (which in this case will also include a hydrogen moiety bonded to the nitrogen, due to the single bond), where $R^5$ is selected from the group consisting of hydrogen and a monovalent organic moiety, and where $R^7$ is a monovalent organic moiety. In such cases, the Z group may be derived from an alpha-beta unsaturated carbonyl, such as an aldehyde or ketone. When the Z group is a fragment of an aldehyde-containing benefit agent, $R^5$ is a hydrogen. When the Z group is a fragment of an ketone-containing benefit agent, $R^5$ is an organic moiety. Such fragments may be derived from and/or result in the release of benefit agents according to the formula $R^7$—CH=CH—C(O)—$R^5$.

In Formula I, the A group may be characterized by the following structure, Formula III:

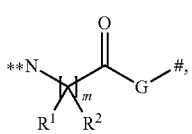

Formula III where $R^1$, $R^2$, G, m, are defined as above, where # represents the point of attachment of G to the hydrophobic moiety Q, and where ** represents the point of attachment to Z and can be a single bond (in which case it is accompanied by an —H also bonded to the nitrogen atom) or a double bond (forming an imine bond with the benefit agent fragment, Z).

The pro-benefit-agent compound may be characterized by a structure according to Formula II, where: m=1; $R^1$ is a side group of a proteinogenic amino acid; $R^2$ is —H. This embodiment may be preferred because it can be based on a naturally-occurring amino acid core. In such cases, it may be further preferred that G=—O—, as the resulting ester may be preferred for environmental reasons.

The pro-benefit-agent compound is preferably according to Formula II, where: G=—O—; m=1; $R^1$ is a side group of a proteinogenic amino acid; $R^2$ is —H; Z is a fragment of a perfume raw material; and Q is an organic group comprising from about 8 to about 18 chain atoms, preferably wherein the chain atoms are carbon atoms. In such a configuration, the pro-benefit-agent compound is believed to provide advantageous performance benefits, as well as having a beneficial environmental profile.

It may be that the pro-benefit-agent compound is preferably according to Formula II, where: G=—N($R^3$)—; m=1; $R^1$ is a side group of a proteinogenic amino acid; $R^2$ is —H; Z is a fragment of a perfume raw material; and Q is an organic group comprising from about 1 to about 18 chain atoms, preferably wherein the chain atoms are carbon atoms; $R^3$ is an organic group comprising from about 1 to about 16 chain atoms, preferably wherein the chain atoms are carbon atoms; wherein the total number of chain atoms in Q and $R^3$ is from 5 to 34.

It may be that the pro-benefit-agent compound is preferably according to Formula II, where: G=—N($R^3$)—; m=1; $R^1$ is a side group of a proteinogenic amino acid; $R^2$ is —H; Z is a fragment of an anti-microbial agent; Q is an organic group comprising from about 1 to about 18 chain atoms, preferably wherein the chain atoms are carbon atoms; $R^3$ is an organic group comprising from about 1 to about 16 chain atoms, preferably wherein the chain atoms are carbon atoms; wherein the total number of chain atoms in Q and $R^3$ is from 5 to 34.

Benefit Agents and Fragments Thereof

The pro-benefit-agent compounds of the present disclosure comprise benefit agent fragments that are derived from aldehyde-containing benefit agents, ketone-comprising benefit agents, or a combination thereof. The benefit agent fragment may be derived from a benefit agent that comprises an aldehyde moiety. The benefit agent fragment may be derived from a benefit agent that comprises a ketone moiety. The benefit agent may comprise an alpha-beta unsaturated carbonyl group that is an aldehyde or ketone moiety.

As used herein, the benefit agent from which the benefit agent fragment is derived may be called a parent benefit agent.

The aldehyde or ketone moiety of the parent benefit agent may react with a nitrogen atom of the compound's core (e.g., the nitrogen of an amino acid), resulting in a benefit agent fragment being joined to the core at the nitrogen atom. As described above, this may be through a linking bond that may be a double bond that is an imine bond or a single bond formed through a 1,4-addition process, such as a 1,4 Michael-type addition. When the linking bond connecting the benefit agent fragment to the nitrogen atom is formed through a 1,4-addition, the parent benefit agent may comprise an alpha-beta unsaturated carbonyl, where the carbonyl is an aldehyde moiety or a ketone moiety.

When the linking bond is broken, for example through hydrolysis, the benefit agent is released. The linking bond may be broken through a triggering condition, such as the presence of water or increased temperature.

The benefit agent fragment may be derived from any suitable benefit agent, which may include a perfume raw material, an antimicrobial agent, a pesticide, an insect repellant, an anti-fungal agent, a herbicidal agent, a hueing dye, an antioxidant, a non-perfume organoleptic, or a combination thereof, preferably a perfume raw material, an antimicrobial agent, or a combination thereof, more preferably a perfume raw material. A few of these benefit agents are discussed in more detail below.

A. Perfume Raw Materials

The benefit agent may be a perfume raw material ("PRM") that comprises an aldehyde moiety, a ketone moiety, or a mixture thereof. The benefit agent fragment (e.g., the Z group) may be derived from a perfume raw material.

The term "perfume raw material" (or "PRM") as used herein refers to compounds that may have a molecular weight of at least about 100 g/mol (optionally up to about 1000 g/mol, preferably up to about 500 g/mol) and which are useful in imparting an odor, fragrance, essence, or scent, either alone or with other perfume raw materials. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

Perfume raw materials that comprise an aldehyde moiety are provided below in Table B. It is believed that the materials provided in Table B are illustrative (but non-limiting) examples of PRMs that are suitable for use according to the present disclosure.

TABLE B

Aldehyde-containing perfume raw materials.

| Number | Registry Name | Trade Name |
|---|---|---|
| 1 | 3-Cyclohexene-1-carboxaldehyde, dimethyl- | Ligustral |
| 2 | 3-Cyclohexene-1-carboxaldehyde, 2,4,6-trimethyl- | Isocyclocitral |
| 3 | Cyclohexanemethanol, .alpha.,3,3-trimethyl-, formate | Aphermate |
| 4 | 3-(4-tert-butylphenyl)butanal; pt-bucinal; 3-(4-tert-butylphenyl)butanal | Lilial |
| 5 | 2-methylundecanal | Methyl Nonyl Acetaldehyde |
| 6 | 1-methyl-3-(4-methylpent-3-enyl)cyclohex-3-ene-1-carbaldehyde; myrmac aldehyde | Precyclemone B |
| 7 | Benzenepropanal, 3-(4-ethylphenyl)-2,2-dimethylpropanal | Floralozone |
| 8 | 2,4-dimethylcyclohex-3-ene-1-carbaldehyde | Ligustral/Triplal |
| 9 | Decanal | Decyl Aldehyde |
| 10 | 10-Undecen-1-al; Undecenoic aldehyde; n-Undecenoic aldehyde; Hendecen-10-al; | Undecylenic aldehyde; Aldehyde C-11, unsaturated; Aldehyde C-11 undecylenic; |
| 11 | 8-,9 and 10-Undecenal, mixture of isomers | Intreleven aldehyde |
| 12 | Benzenepropanal, .alpha.-methyl-4-(1-methylethyl)- | Cylamen Aldehyde; |
| 13 | 2,6,10-trimethylundec-9-enal | Adoxal; Farenal |
| 14 | 4-(octahydro-4,7-methano-5H-inden-5-ylidene)butanal | Dupical |
| 15 | 3-Ethoxy-4-hydroxy benzaldehyde | Ethyl vanillin |
| 16 | tricyclo[5.2.1.02,6]decane-3-carbaldehyde | Vertral ® |
| 17 | 4,7-Methano-1H-indene-2-carboxaldehyde, octahydro-5-methoxy-; 6-Methoxy dicyclopentadiene carboxaldehyde; 8-Methoxytricyclo(5.2.2.1)decane-4-carboxaldehyde; Octahydro-5-methoxy-4,7-methano-1H-indene-2-carboxaldehyde; | Scentenal ® 981810 |
| 18 | 4-Hydroxy-3-methoxybenzaldehyde | Vanillin |
| 19 | Trans-4-decenal | Decenal-4-trans |
| 20 | α-hexyl-; α-n-Hexyl-β-phenylacrolein; 2-Hexyl-3-phenyl-2-propenal; 2-Hexyl-3-phenyl-propenal; (2Z)-2-Hexyl-3-phenyl-2-propenal; Hexyl-3-phenyl-propenal; n-Hexyl cinnamaldehyde; (2E)-2-Benzylideneoctanal; 2-[(E)-Benzylidene]octanal | α-Hexylcinnamaldehyde; α-Hexylcinnamic aldehyde; Hexyl cinnamic aldehyde; Hexylcinnamaldehyde; Cinnamaldehyde, |
| 21 | 4-Dodecenal | Tangerinal DIPG 984655 |
| 22 | 3-Cyclohexene-1-propanal,beta,4-dimethyl- | Liminal ® 955374 |
| 23 | trans-2-Dodecenal | Mandarine aldehyde 10% CITR 965765 |
| 24 | 4,8-Dimethyl-4,9-decadienal | Floral Super |
| 25 | Hydroxymyrac aldehyde; 4-(4-Hydroxy-4-methyl-pentyl)-3-cyclohexen-1-carboxaldehyde; Lyral; Kovanol | Lyral |
| 26 | 2-Hexenal, (E)- | 2-Hexenal |
| 27 | Benzaldehyde | Benzaldehyde |
| 28 | Benzeneacetaldehyde | Phenyl Acetaldehyde |
| 29 | Benzeneacetaldehyde, .alpha.-methyl- | Hydratropic Aldehyde |
| 30 | 3-Cyclohexene-1-carboxaldehyde, 3,5-dimethyl- | Cyclal C, |
| 31 | Benzaldehyde, 4-methoxy- | Anisic Aldehyde |
| 32 | Octanal, 7-hydroxy-3,7-dimethyl- | Hydroxycitronellal |
| 33 | 3-Cyclohexene-1-carboxaldehyde, 3,6-dimethyl- | Cyclovertal |
| 34 | Octanal, 7-methoxy-3,7-dimethyl- | Methoxycitronellal Pq |
| 35 | Benzenepropanal, beta.-methyl-; 3-phenylbutanal | Trifernal |
| 36 | 4,7-Methano-1H-indenecarboxaldehyde, octahydro- | Formyltricyclodecan |
| 37 | Octanal | Octyl Aldehyde |
| 38 | 5-Heptenal, 2,6-dimethyl- | Melonal |
| 39 | Octanal, 3,7-dimethyl- | Dihydrocitronellal |
| 40 | 2-Nonenal | 2 Nonen-1-al |
| 41 | 6-Octenal, 3,7-dimethyl- | Citronellal |
| 42 | 2-Decenal | 2 Decene-1-al |
| 43 | 2,6-Octadienal, 3,7-dimethyl- | Citral |
| 44 | Undecenal | Iso C-11 Aldehyde |
| 45 | Undecanal | Undecyl Aldehyde |
| 46 | 2-Undecenal | 2-Undecene-1-Al |
| 47 | Benzaldehyde, 4-(1-methylethyl)- | Cuminic Aldehyde |
| 48 | Decanal, 2-methyl- | Methyl Octyl Acetaldehyde |
| 49 | Benzenepropanal, 4-(1,1-dimethylethyl)- | Bourgeonal |
| 50 | 2-Dodecenal | 2 Dodecene-1-al |
| 51 | Benzenepropanal, .beta.-methyl-3-(1-methylethyl)- | Florhydral |
| 52 | 1,3-Benzodioxole-5-carboxaldehyde | Heliotropin |
| 53 | 3-Cyclohexene-1-carboxaldehyde, 1-methyl-4-(4-methylpentyl)- | Vernaldehyde |
| 54 | Benzenepropanal, 4-methoxy-.alpha.-methyl- | Canthoxal |
| 55 | Cyclohexenebutanal, .alpha.,2,2,6-tetramethyl- | Cetonal |
| 56 | Dodecanal | Lauric Aldehyde |
| 57 | 5,9-Undecadienal, 2,6,10-trimethyl- | Oncidal |
| 58 | Bicyclo[2.2.2]oct-5-ene-2-carboxaldehyde, 6-methyl-8-(1-methylethyl)- | Maceal |
| 59 | 2-methyl-3-[4-(2-methylpropyl)phenyl]propanal | cyclamen homoaldehyde |
| 60 | 6-methoxy-2,6-dimethyloctanal | calypsone |

TABLE B-continued

Aldehyde-containing perfume raw materials.

| Number | Registry Name | Trade Name |
|---|---|---|
| 61 | 4-propan-2-ylbenzaldehyde | Cuminic Aldehyde |
| 62 | 3,6-dimethylcyclohex-3-ene-1-carbaldehyde | VERTOLIFF |
| 63 | 2-methyl-3-(4-methylphenyl)propanal | Jasmorange ®; satinaldehyde |
| 64 | 3-phenylprop-2-enal | Cinnamic Aldehyde |

The perfume raw material that formed the benefit agent fragment may be selected from the group consisting of the aldehyde-containing PRMs of Table A, above. The PRM that formed the PRM fragment may comprise an aldehyde moiety and preferably be selected from the group consisting of 2 methyl nonyl acetaldehyde: benzaldehyde; floralozone; isocyclocitral; triplal (ligustral); precylcemone B; lilial; decyl aldehyde; undecylenic aldehyde; cyclamen homoaldehyde; cyclamen aldehyde; dupical; oncidal; adoxal; melonal; calypsone; anisic aldehyde; heliotropin; cuminic aldehyde; scentenal; 3,6-dimethylcyclohex-3-ene-1-carbaldehyde; satinaldehyde; canthoxal; vanillin; ethyl vanillin; cinnamic aldehyde; cis-4-decenal; trans-4-decenal; cis-7-decenal; undecylenic aldehyde; trans-2-hexenal; trans-2-octenal; 2-undecenal; 2,4-dodecadeienal; cis-4-heptenal; Florydral; butyl cinnamaldehyde; limonelal; amyl cinnamaldehyde; hexyl cinnamaldehyde; citronellal; citral; cis-3-hexen-1-al; and mixtures thereof.

As mentioned above, the pro-benefit-agent compound may include a fragment of a perfume raw material that comprises a ketone moiety. Perfume raw materials that comprise a ketone moiety are provided below in Table C. It is believed that the materials provided in Table C are illustrative (but non-limiting) examples of PRMs that are suitable for use according to the present disclosure.

TABLE C

Ketone-containing perfume raw materials.

| Number | Registry Name | Trade Name |
|---|---|---|
| 1 | 2-Buten-1-one, 1-(2,6,6-trimethyl-3-cyclohexen-1-yl)- | delta-Damascone |
| 2 | (1-(2,6,6-Trimethyl-2-cyclohexen-1-yl)-2-buten-1-one); 2-Buten-1-one, 1-(2,6,6-trimethyl-2-cyclohexen-1-yl)-, (E)- | alpha-Damascone |
| 3 | (1-(2,6,6-Trimethyl-1-cyclohexen-1-yl)-2-buten-1-one); 2-Buten-1-one, 1-(2,6,6-trimethyl-1-cyclohexen-1-yl)-, (E)- | beta-Damascone |
| 4 | 2-Buten-1-one, 1-(2,6,6-trimethyl-1,3-cyclohexadien-1-yl)- | Damascenone |
| 5 | 1,1,2,3,3-pentamethyl-2,5,6,7-tetrahydroinden-4-one | Cashmeran |
| 6 | 1-(5,5-dimethyl-1-cyclohexenyl)pent-4-en-1-one | Neobutenone Alpha |
| 7 | 1-(5,5-dimethyl-1-cyclohexenyl)pent-4-en-1-one | Galbascone; Dynascone |
| 8 | 1-naphthalen-2-ylethanone | Methyl Beta-Naphthyl Ketone |
| 9 | 2-(2-(4-Methyl-3-cyclohexen-1-yl)propyl)cyclo-pentanone | Nectaryl |
| 10 | 2-Hexyl-2-cyclopenten-1-one (main component) | Isojasmone B 11 |
| 11 | Methyl 2,6,10-Trimethyl-2,5,9-cyclododecatrien-1-yl ketone; | Trimofix "O" |

TABLE C-continued

Ketone-containing perfume raw materials.

| Number | Registry Name | Trade Name |
|---|---|---|
| 12 | α-Isomethyl ionone; 5-(2,6,6-Trimethyl-2-cyclohexen-1-yl)-3-methyl-3-buten-2-one; | Methyl ionone; Methyl Ionone Alpha Iso; Methyl Ionone Gamma; Isoraldeine 70; Isoraldeine 95; Gamma Methylionone 600 UC; Alpha Daphnone; Iraldeine gamma; gamma Methyl Ionone Pure; gamma Methyl Ionone A; Gamma Methyl Ionone Coeur |
| 13 | 2-Heptylcyclopentanone; | Fleuramone; Projasmon |
| 14 | 3-(Hydroxymethyl)nonan-2-one (and isomer) | Methyl lavender ketone |
| 15 | 2-Cyclohexen-1-one, 2-methyl-5-(1-methylethenyl)-, (R)- | Laevo Carvone |
| 16 | Bicyclo[2.2.1]heptan-2-one, 1,7,7-trimethyl-,(1R)- | Camphor Gum |
| 17 | 2-Heptanone | Methyl Amyl Ketone |
| 18 | 3-Octanone | Ethyl Amyl Ketone |
| 19 | 2-Octanone | Methyl Hexyl Ketone |
| 20 | 5-Hepten-2-one, 6-methyl- | Methyl Heptenone |
| 21 | Ethanone, 1-(4-methylphenyl)- | Para Methyl Acetophenone |
| 22 | 2-Butanone, 4-phenyl- | Benzyl Acetone |
| 23 | 1,4-Methanonaphthalen-5(1H)-one, 4,4a,6,7,8,8a-hexahydro- | Tamisone |
| 24 | 2H-1-Benzopyran-2-one, 3,4-dihydro- | Dihydrocoumarin |
| 25 | Cyclohexanone, 5-methyl-2-(1-methylethyl)-,cis- | Iso Menthone |
| 26 | 2H-Pyran-2-one, 6-butyltetrahydro- | Nonalactone |
| 27 | 3-Hepten-2-one, 3,4,5,6-pentamethyl- | Koavone |
| 28 | Cyclopentanone, 3-methyl-2-pentyl- | Jasmylone |
| 29 | 3-Nonanone | Ethyl Hexyl Ketone |
| 30 | Ethanone, 1-(3,3-dimethylcyclohexyl)- | Herbac |
| 31 | 3-Heptanone, 5-methyl-, oxime | Stemone |
| 32 | Cyclohexanone, 2-(1-methylpropyl)- | 2-Sec-Butyl Cyclo Hexanone |
| 33 | Cyclopentanone, 2-pentyl- | Delphone |
| 34 | 2-Cyclopenten-1-one, 3-methyl-2-pentyl- | Dihydrojasmone |
| 35 | Cyclohexanone, 5-methyl-2-(1-methylethyl)-,trans- | Menthone Racemic |
| 36 | Cyclohexanone, 4-(1,1-dimethylpropyl)- | Orivone |
| 37 | 2-Undecanone | Methyl Nonyl Ketone |
| 38 | 1-Decanol | Rhodalione |
| 39 | 2-Cyclohexen-1-one, 3-methyl-5-propyl- | Livescone |
| 40 | 2-Cyclopenten-1-one, 2-methyl-3-(2-pentenyl)- | Iso Jasmone |
| 41 | Ionone | Ionone Ab |
| 42 | 3-Buten-2-one, 4-(2,6,6-trimethyl-2-cyclohexen-1-yl)-, (E)- | Ionone Alpha |
| 43 | 3-Buten-2-one, 4-(2,6,6-trimethyl-1-cyclohexen-1-yl)- | Ionone Beta |
| 44 | 2-Buten-1-one, 1-(2,4,4-trimethyl-2-cyclohexen-1-yl)-, (E)- | Isodamascone N |
| 45 | 2H-1-Benzopyran-2-one | Coumarin |
| 46 | Cyclopentanone, 2-heptyl- | Fleuramone |

TABLE C-continued

Ketone-containing perfume raw materials.

| Number | Registry Name | Trade Name |
|---|---|---|
| 47 | 3-Decanone, 1-hydroxy- | Methyl Lavender Ketone |
| 48 | 1-Propanone, 1-[2-methyl-5-(1-methylethyl)-2-cyclohexen-1-yl]- | Nerone |
| 49 | 9-Undecen-2-one, 6,10-dimethyl- | Tetra Hydro Psuedo Ionone |
| 50 | 1-phenylethanone | Acetophenone |
| 51 | 2-butan-2-ylcyclohexan-1-one | Freskomenthe |
| 52 | Ethanone, 1-(3-methyl-2-benzofuranyl)- | nerolione |
| 53 | 4-(4-methoxyphenyl)butan-2-one | Anisyl Acetone |

The perfume raw material that formed the PRM fragment may be selected from the group consisting of the ketone-containing PRMs of Table C, above. The PRM that formed the PRM fragment may comprise a ketone moiety and may preferably be selected from the group consisting of nerolione; 4-(4-methoxyphenyl)butan-2-one; 1-naphthalen-2-ylethanone; nectaryl; trimofix O; fleuramone; delta-damascone; beta-damascone; alpha-damascone; methyl ionone; 2-hexylcyclopent-2-en-1-one; galbascone; and mixtures thereof.

The benefit agent fragment may be derived from a benefit agent that is a perfume raw material, preferably a perfume raw material selected from the group consisting of: methyl nonyl acetaldehyde: benzaldehyde; floralozone; isocyclocitral; triplal (ligustral); precylcemone B; lilial; decyl aldehyde; undecylenic aldehyde; cyclamen homoaldehyde; cyclamen aldehyde; dupical; oncidal; adoxal; melonal; calypsone; anisic aldehyde; heliotropin; cuminic aldehyde; scentenal; 3,6-dimethylcyclohex-3-ene-1-carbaldehyde; satinaldehyde; canthoxal; vanillin; ethyl vanillin; cinnamic aldehyde; cis-4-decenal; trans-4-decenal; cis-7-decenal; undecylenic aldehyde; trans-2-hexenal; trans-2-octenal; 2-undecenal; 2,4-dodecadeienal; cis-4-heptenal; Florydral; butyl cinnamaldehyde; limonelal; amyl cinnamaldehyde; hexyl cinnamaldehyde; citronellal; citral; cis-3-hexen-1-al; nerolione; 4-(4-methoxyphenyl)butan-2-one; 1-naphthalen-2-ylethanone; nectaryl; trimofix O; fleuramone; delta-damascone; beta-damascone; alpha-damascone; methyl ionone; 2-hexylcyclopent-2-en-1-one; galbascone; and mixtures thereof.

When the benefit agent fragment is derived from a perfume raw material, preferably a PRM as listed in the previous paragraph, it may be preferred that the hydrophobic moiety is an organic group comprising from about 8 to about 18 chain atoms, more preferably from about 10 to about 18 chain atoms, preferably wherein the chain atoms are carbon atoms. It is believed that such chain lengths provide a suitable degree of hydrophobicity to facilitate deposition benefits, particularly in laundry applications where the pro-benefit-agent compounds are used in aqueous liquors.

The perfume raw materials in this specification, including the perfume raw materials listed above, can be obtained from various suppliers including: International Flavors and Fragrances of New York, NY USA; Givaudan of Vernier Switzerland; Firmenich of Geneva, Switzerland; Symrise of Holzminden, Germany; Kao of Tokyo, Japan; Takasago of Tokyo, Japan; and Florasynth of Tel-Aviv, Israel.

B. Anti-Microbial Agents

The benefit agent may be an anti-microbial agent that comprises an aldehyde moiety, a ketone moiety, or a mixture thereof.

Suitable anti-microbial agents for use in the present pro-benefit-agent compounds may include acetylacetone enolate, gossypol, nootkatone, or mixtures thereof.

When the benefit agent fragment is derived from an anti-microbial agent, preferably an anti-microbial agent as listed in the previous paragraph, it may be preferred that the hydrophobic moiety is an organic group comprising from about 6 to about 12 chain atoms, preferably wherein the chain atoms are carbon atoms. It is believed that such chain lengths provide a suitable degree of hydrophobicity to facilitate anti-microbial benefits and is believed to facilitate desired interactions between the anti-microbial agent and the target microbes.

Methods of Making a Pro-Benefit-Agent Compound and Related Precursor Compounds

The pro-benefit-agent compounds according to the present disclosure may be made by reacting a pro-benefit-agent precursor compound with a benefit agent. The present disclosure thus relates to processes of making a pro-benefit-agent compound.

The pro-benefit-agent precursor compound (or simply "precursor compound" as used herein) may comprise a carbon-containing core, the carbon-containing core comprising a carbon backbone, one or more side groups, a nitrogen atom (preferably a nitrogen atom that is part of a primary amine group, —$NH_2$), and a carbonyl group, wherein the carbonyl group is part of a carbonyl-containing moiety that is selected from an ester moiety, an amide moiety, or a thioester moiety, wherein the carbonyl-containing moiety comprises a heteroatom joined to the carbon of the carbonyl group, wherein the heteroatom is selected from oxygen, nitrogen, or sulfur, wherein the carbonyl-containing moiety further comprises a hydrophobic moiety joined to the heteroatom, wherein the hydrophobic moiety is an organic group comprising 5 to 34 chain atoms.

In effect, the precursor compound may be the pro-benefit-agent compound prior to its reaction with the benefit agent, where the nitrogen atom is in primary amine (—$NH_2$) form. The cores, side groups, carbonyl-containing moieties, and hydrophobic moieties are preferably as previously described.

The pro-benefit-agent precursor compound may be characterized by a structure according to Formula IV:

$$H_2\text{—A-Q} \quad \text{Formula IV,}$$

where the two hydrogen atoms are each attached to the nitrogen atom of the A group, and A and Q are as substantially described above.

The pro-benefit-agent precursor compound may be characterized by a structure according to Formula V:

Formula V

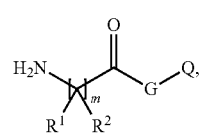

where $R^1$, $R^2$, m, G, and Q are defined as above. The preferences provided above for the remaining groups or indices equally apply to Formula V.

The pro-benefit-agent precursor compound may be made by reacting the carboxyl group of an amino acid with a compound according to the following formula H-G-Q, for example through an esterification, an amidation, or a thioesterification reaction.

Premix

The present disclosure further relates to certain premix compositions and methods of making such compositions. Premixes can be conveniently prepared ahead of product formulation, and even prepared at one manufacturing site and shipped to another for product formulation.

The premix compositions may comprise a pro-benefit-agent precursor compound, where the precursor compound is as described above, and a benefit agent, where the benefit agent is as described above. The preferences expressed above for the pro-benefit-agent compound, its components, and/or its precursors apply equally here.

For example, the premix composition may comprise: a pro-benefit-agent precursor compound, wherein the precursor compound comprises a carbon-containing core, the core comprising a side group and an amine group, and a hydrophobic moiety joined to the core by a carbonyl moiety, wherein the carbonyl moiety is selected from an ester moiety, an amide moiety, or a thioester moiety; and a benefit agent, the benefit agent comprising an aldehyde moiety, a ketone moiety, or combinations thereof.

For loading efficiency reasons, it is preferred to reasonably match the molar amount of the benefit agent, preferably a first benefit agent, with the molar amount of the carrier molecules as described above (here, the pro-benefit-agent precursor compound). For example, the premix composition may comprise the pro-benefit-agent precursor compound and the benefit agent in a molar ratio of from about 3:1 to about 1:3, preferably from about 2:1 to about 1:2, preferably from about 1.5:1 to about 1:1.5, more preferably from about 1.2:1 to about 1:1.2, even more preferably from about 1:1.

Even more specifically, for loading efficiency reasons, it is preferred to reasonably match the molar amount of the benefit agent, preferably a first benefit agent, with the molar equivalent of the reacting functional groups (e.g., preferably amine groups) of the carrier molecules as described above (here, the pro-benefit-agent precursor compound). For example, the premix composition may comprise the reacting functional groups (e.g., preferably amine groups) of the pro-benefit-agent precursor compound and benefit agent in a molar ratio of from about 3:1 to about 1:3, preferably from about 2:1 to about 1:2, preferably from about 1.5:1 to about 1:1.5, more preferably from about 1.2:1 to about 1:1.2, even more preferably from about 1:1. When the pro-benefit-agent precursor compound comprises multiple attachment points, or multiple functional groups capable of forming such attachment points, for the benefit agent and optionally a second benefit agent, the premix composition may include such functional groups of the pro-benefit-agent precursor compound and the benefit agent (plus optionally a second benefit agent that is also capable of attaching to the precursor compound) present in a molar ratio of from about 3:1 to about 1:3, preferably from about 2:1 to about 1:2, preferably from about 1.5:1 to about 1:1.5, more preferably from about 1.2:1 to about 1:1.2, even more preferably from about 1:1.

The premix composition may be in the form of a neat fluid, and little to no water may be present. In such cases, it may be desirable to include a water scavenger such as magnesium sulfate in the premix, and/or to physically remove water, such as via a molecular sieve or in vacuo. The premix composition may comprise less than about 10%, preferably less than 5%, more preferably less than 10%, even more preferably less than 0.1% water, by weight of the premix composition. Low-water premix compositions may be particularly preferred when they are intended to be formulated into low-water product compositions, such as solids like pastilles, or compact formulations like unit dose compositions that are encapsulated in water-soluble films. When the premix is a low-water premix, the premix may comprise from about 1% to about 100%, preferably from about 5% to about 100%, more preferably from about 20% to about 100%, by weight of the premix composition, of the pro-benefit-agent compound. When the premix is a low water premix, the premix may comprise from about 0.01% to about 80%, preferably from about 0.01% to about 20%, by weight of the premix composition, of the pro-benefit agent precursor compound. When the premix is a low-water premix, the premix may comprise from about 0.01% to about 80%, preferably from about 0.01% to about 20%, by weight of the premix composition, of the benefit agent.

The premix composition may comprise water. The premix composition may be in the form of an emulsion, preferably an oil-in-water emulsion. When the premix is in the form of an emulsion and comprises water, water may be present at a level of from about 50% to about 95%, preferably from about 60% to about 90%, by weight of the premix composition. When the premix comprises water, the pro-benefit-agent precursor compound may be added at a level of from about 0.01% to about 7.5%, by weight of the premix composition. When the premix comprises water, the benefit agent may be added at a level of from about 0.01% to about 7.5%, by weight of the premix composition.

In the premix composition, the precursor compound and the benefit agent may react to form a pro-benefit-agent compound, as described above. The precursor compound, the benefit agent, and the pro-benefit-agent compound may all be present in an equilibrium. Because the formation of a pro-benefit-agent compound comprising an imine produces water through a condensation process, the equilibrium may be tilted towards the reactant side (e.g., precursor compound and benefit agent) of the reaction when the premix comprises water. Vice versa, relatively more of the pro-benefit-agent compound may be present when the premix is substantially free of intentionally added water, although it is recognized that some water forms as a result of the condensation reaction. Where the formation of the pro-benefit agent compound involves a 1,4-addition, the equilibrium is not dependent on water, but rather is believed to depend on the balance between entropic and enthalpic contributions.

The sum of the weight percents of the pro-benefit-agent precursor, the benefit agent, and the pro-benefit-agent compound, if present, may be from about 10% to about 100%, preferably from about 25% to about 100%, preferably from about 50% to about 100%, more preferably from about 75% to about 100%, by weight of the premix composition.

The premix composition, or a portion thereof, may be obtained by combining from about 1 part to about 99 parts, preferably from about 5 to about 80 parts, by weight of the pro-benefit-agent precursor compound with about 1 part to about 99 parts, preferably from about 5 to about 80 parts, by weight of the benefit agent, wherein the resulting mixture is understood to comprise a total of 100 parts by weight.

The premix composition may include multiple precursors, multiple benefit agent, and/or multiple pro-benefit-agent compounds. The premix composition may further comprise additional agents that do not react to form pro-benefit-agent compounds according to the present disclosure. For example, the premix compositions may comprise additional PRMs, surfactants, solvents, or other processing or stability aids.

The premix composition may comprise a surfactant, preferably a nonionic surfactant. Surfactants may help with stability of the premix compositions, and/or with the emulsification process.

The present disclosure also relates to methods of making such premix compositions. The method may include the steps of combining a pro-benefit-agent precursor as described herein (e.g., according to Formulas IV or V above) with a benefit agent as described herein, wherein the benefit agent comprises an aldehyde moiety, a ketone moiety, or a combination thereof. The materials may combined in the proportions provided above. The method may include removing or otherwise binding free water, which may help to drive the reaction in the premix towards the product (e.g., the pro-benefit-agent compound). When the premix composition comprises water, the precursor compound and the water may preferably be combined before the benefit agent is added. Alternatively, the benefit agent and the water may be combined before the benefit agent is added.

Treatment Composition

The present composition relates to treatment compositions that include an adjunct ingredient and a pro-benefit-agent compound, as described above.

The treatment compositions may be consumer product compositions. The consumer products compositions of the present disclosure may be useful in baby care, beauty care, fabric care, home care, family care, feminine care, and/or health care applications. The treatment compositions may be useful for treating a surface, such as fabric, hair, or skin. The consumer product compositions may be intended to be used or consumed in the form in which it is sold. The consumer product compositions may be not intended for subsequent commercial manufacture or modification.

The treatment composition may be a household care composition. The treatment composition may be a fabric care composition, a hard surface cleaner composition, a dish care composition, a hair care composition (such as shampoo or conditioner), a body cleansing composition, or a mixture thereof.

The treatment composition may be a fabric care composition, such as a laundry detergent composition (including a heavy-duty liquid washing detergent or a unit dose article), a fabric conditioning composition (including a liquid fabric softening and/or enhancing composition), a laundry additive, a fabric pre-treat composition (including a spray, a pourable liquid, or a spray), a fabric refresher composition (including a spray), or a mixture thereof.

The treatment composition may be a beauty care composition, such as a hair treatment product (including shampoo and/or conditioner), a skin care product (including a cream, lotion, or other topically applied product for consumer use), a shave care product (including a shaving lotion, foam, or pre- or post-shave treatment), personal cleansing product (including a liquid body wash, a liquid hand soap, and/or a bar soap), a deodorant and/or antiperspirant, or mixtures thereof.

The treatment composition may be a home care composition, such as an air care, car care, dishwashing, hard surface cleaning and/or treatment, and other cleaning for consumer or institutional use.

The treatment composition may be in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

The treatment composition may be in the form of a liquid. The liquid composition may include from about 30%, or from about 40%, or from about 50%, to about 99%, or to about 95%, or to about 90%, or to about 75%, or to about 70%, or to about 60%, by weight of the composition, of water. The liquid composition may be a liquid laundry detergent, a liquid fabric conditioner, a liquid dish detergent, a hair shampoo, a hair conditioner, or a mixture thereof.

The treatment composition may be in the form of a solid. The solid composition may be a powdered or granular composition. Such compositions may be agglomerated or spray-dried. Such composition may include a plurality of granules or particles, at least some of which include comprise different compositions. The composition may be a powdered or granular cleaning composition, which may include a bleaching agent. The composition may be in the form of a bead or pastille, which may be pastilled from a liquid melt. The composition may be an extruded product.

The treatment composition may be in a particulate form, such as a plurality of particulates. Individual particulates may have a mass from about 1 mg to about 1 g. The emulsion may be dispersed in a water-soluble carrier. The water-soluble carrier may be selected from the group consisting of polyethylene glycol, sodium acetate, sodium bicarbonate, sodium chloride, sodium silicate, polypropylene glycol polyoxoalkylene, polyethylene glycol fatty acid ester, polyethylene glycol ether, sodium sulfate, starch, and mixtures thereof. The water-soluble carrier may be a water-soluble polymer. The treatment composition, when in particulate form, may comprise from about 25 wt % to about 99.99 wt % of the water-soluble carrier, and from about 0.001 wt % to about 50 wt % by weight the pro-benefit-agent compound. The particulate form may be in the form of a bead or pastille.

The treatment composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The treatment composition may be in the form of a spray and may be dispensed, for example, from a bottle via a trigger sprayer and/or an aerosol container with a valve.

The treatment composition may have a viscosity of from 1 to 1500 centipoises (1-1500 mPa*s), from 100 to 1000 centipoises (100-1000 mPa*s), or from 200 to 500 centipoises (200-500 mPa*s) at 20 s$^{-1}$ and 21° C.

The treatment composition may comprise from about 0.0010% to about 30%, preferably from about 0.001% to about 20%, more preferably from about 0.001% to about 15%, 0.001% to about 10%, preferably from about 0.01% to about 5%, by weight of the treatment composition, of the pro-benefit-agent compound.

The treatment composition may comprise the pro-benefit-agent compound in an amount sufficient to deliver from about 0.01% to about 10%, preferably from about 0.1% to about 5%, by weight of the treatment composition, of the benefit agent that is to be released by the pro-benefit-agent compound.

Adjunct Ingredient

The treatment compositions of the present disclosure, which may be consumer products, may comprise an adjunct material. The adjunct material may provide a benefit in the intended end-use of a composition, or it may be a processing and/or stability aid.

Suitable adjunct materials may include: surfactants, conditioning actives, deposition aids, rheology modifiers or structurants, antioxidants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, perfume delivery systems (such as core/shell encapsulates, other pro-fragrance materials, and the like), structure elasticizing agents, carriers, hydrotropes, processing aids, anti-agglomeration agents, coatings, formaldehyde scavengers, and/or pigments.

Depending on the intended form, formulation, and/or end-use, compositions of the present disclosure or may not may not contain one or more of the following adjunct materials: surfactants, conditioning actives, deposition aids, rheology modifiers or structurants, antioxidants, bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids, structurants, anti-agglomeration agents, coatings, formaldehyde scavengers and/or pigments.

The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

A. Surfactants

The treatment compositions of the present disclosure may comprise surfactant. Surfactants may be useful for providing, for example, cleaning benefits. The compositions may comprise a surfactant system, which may contain one or more surfactants.

The treatment compositions of the present disclosure may include from about 0.10% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), sodium lauryl sulfate (SLS), sodium lauryl ether sulfate (SLES), and/or alkyl ethoxylated carboxylates (AEC). The anionic surfactants may be present in acid form, salt form, or mixtures thereof. The anionic surfactants may be neutralized, in part or in whole, for example, by an alkali metal (e.g., sodium) or an amine (e.g., monoethanolamine).

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branhed alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12\text{-}14}$ dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

Depending on the formulation and/or the intended end-use, the composition may be substantially free of certain surfactants. For example, liquid fabric enhancer compositions, such as fabric softeners, may be substantially free of anionic surfactant, as such surfactants may negatively interact with cationic ingredients.

B. Conditioning Active

The treatment compositions of the present disclosure may include a conditioning active. Compositions that contain conditioning actives may provide softness, anti-wrinkle, anti-static, conditioning, anti-stretch, color, and/or appearance benefits.

Conditioning actives may be present at a level of from about 1% to about 99%, by weight of the composition. The composition may include from about 1%, or from about 2%, or from about 3%, to about 99%, or to about 75%, or to about 50%, or to about 40%, or to about 35%, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, polyhydroxystearic acid and/or derivatives thereof, glyceride copolymers, or combinations thereof. Preferably, the conditioning active is a cationic conditioning active, which may improve the delivery/deposition of the pro-benefit-agent compound.

The treatment composition may comprise a conditioning active, where the conditioning active comprises quaternary ammonium ester compounds. Preferably, the quaternary ammonium ester compounds are present at a level of from about 2 wt % to about 35 wt %, preferably from about 4 wt % to about 25 wt %, more 5 wt % to about 20 wt %, even more preferably from about 6 wt % to about 15 wt %, even more preferably from about 7 wt % to about 12 wt %, by weight of the treatment composition. The quaternary ammonium ester compounds (also known as "ester quats") may be monoester quats, diester quats, triester quats, or a combination thereof; preferably, diester quat material forms the major portion (whether a majority or a plurality) of the ester quat compounds. It is believed that in addition to providing conditioning benefits, selecting the proper type and/or level of conditioning active (namely, a quaternary ammonium ester compound) can improve the deposition and/or performance of the pro-benefit-agent compounds described in the present disclosure.

The quaternary ammonium ester compound may comprise compounds according to the following formula:

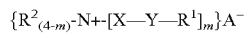

wherein:
m is 1, 2 or 3, with provisos that, in a given molecule, the value of each m is identical;
each $R^1$, which may comprise from 13 to 22 carbon atoms, is independently a linear hydrocarbyl or branched hydrocarbyl group, preferably $R^1$ is linear, more preferably $R^1$ is partially unsaturated linear alkyl chain;
each $R^2$ is independently a $C_1$-$C_3$ alkyl or hydroxyalkyl group and/or each $R^2$ is selected from methyl, ethyl, propyl, hydroxyethyl, 2-hydroxypropyl, 1-methyl-2-hydroxyethyl, poly($C_2$-$C_3$ alkoxy), polyethoxy, benzyl, more preferably methyl or hydroxyethyl;
each X is independently —($CH_2$)n-, —$CH_2$—CH($CH_3$)— or —CH($CH_3$)—$CH_2$—, where each n is independently 1, 2, 3 or 4, preferably each n is 2;
each Y is independently —O—(O)C— or —C(O)—O—; and
A- is independently selected from the group consisting of chloride, bromide, methyl sulfate, ethyl sulfate, sulfate, and nitrate, preferably A- is selected from the group consisting of chloride and methyl sulfate, more preferably A- is methyl sulfate.

For monoester quats, m is 1. For diester quats, m is 2. For triester quats, m is 3. The conditioning active may comprise a mixture of monoester quats and diester quats, or even a mixture of monoester quats, diester quats, and triester quats. As will be appreciated by one of ordinary skill, the mixture may depend, in part, on the starting/feedstock materials, such dialkanolamines or trialkanolamines.

The quaternary ammonium ester compound may be derived from fatty acids characterized by an Iodine Value of from 0 to 140, or from 0 to about 90, or from about 10 to about 70, or from about 15 to about 50, or from about 18 to about 30. Iodine Values may be determined according to the method provided in US2020/0407665 (equivalent to WO2020/264566).

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

The composition may contain mixtures of different types of conditioning actives. The compositions of the present disclosure may contain a certain conditioning active but be substantially free of others. For example, the composition may be free of quaternary ammonium ester compounds, silicones, or both. The composition may comprise quaternary ammonium ester compounds but be substantially free of silicone. The composition may comprise silicone but be substantially free of quaternary ammonium ester compounds.

The conditioning active may comprise glyceride copolymers. The glyceride copolymers may be derived from natural oils. Examples of natural oils include, but are not limited to, vegetable oils, algae oils, fish oils, animal fats, tall oils, derivatives of these oils, combinations of any of these oils, and the like. Representative non-limiting examples of vegetable oils include low erucic acid rapeseed oil (canola oil), high erucic acid rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil, preferably canola oil. Representative non-limiting examples of animal fats include lard, tallow, poultry fat, yellow grease, and fish oil. Tall oils are by-products of wood pulp manufacture. The glyceride copolymers may be metathesized unsaturated polyol esters.

C. Deposition Aid

The treatment compositions of the present disclosure may comprise a deposition aid. Deposition aids can facilitate deposition of the various benefit agents, including the pro-benefit-agent compounds of the present disclosure, conditioning actives, perfumes or perfume delivery systems (such as encapsulated perfumes), or combinations thereof, improving the performance benefits of the compositions and/or allowing for more efficient formulation of such benefit agents. The composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of a deposition aid. The deposition aid may be a cationic or amphoteric polymer, preferably a cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The deposition aid may be selected from the group consisting of polyvinylformamide, partially hydroxylated polyvinylformamide, polyvinylamine, polyethylene imine, ethoxylated polyethylene imine, polyvinylalcohol, polyacrylates, and combinations thereof.

The cationic polymer may comprise a cationic acrylate and/or cationic methacrylate. Such polymers may be copolymers, for example further comprising a nonionic monomer, such as acrylamide. The cationic polymer may be linear or crosslinked. The deposition aid may comprise a combination of linear cationic polymers and crosslinked cationic polymers.

Deposition aids can be added concomitantly with delivery particles (at the same time with, e.g., encapsulated benefit agents, such as the encapsulated perfume) or directly/independently in the consumer product composition. The weight-average molecular weight of the polymer may be from 500 to 5000000 or from 1000 to 2000000 or from 2500 to 1500000 Dalton, as determined by size exclusion chromatography relative to polyethyleneoxide standards using Refractive Index (RI) detection. The weight-average molecular weight of the cationic polymer may be from 5000 to 37500 Dalton.

D. Perfume and or Perfume Delivery Systems

The treatment compositions of the present disclosure may comprise perfume and/or perfume delivery systems. This may be the case even when the benefit agent fragment of the pro-benefit-agent compound is derived from a perfume raw material.

The treatment compositions of the present disclosure may comprise other perfume raw materials, for example in neat or free form, including PRMs that do not contain an aldehyde or ketone moiety. For example, other PRMs may be provided as neat or free oils to the premix composition and/or the treatment compositions according to the present disclosure, even if they will not react with the pro-benefit-agent precursor compound. Such mixtures may be desirable, for example, to provide a more well-rounded olfactory experience.

The treatment compositions of the present disclosure may further comprise neat perfume, preferably neat perfume raw materials that does not comprise an aldehyde or ketone moiety. Preferably, the neat perfume comprises an alcohol-containing perfume raw material. Suitable alcohol-containing perfume raw materials are known to one of ordinary skill in the art, and may include geraniol, citronellol, cinnamic alcohol, eugenol, and the like. That being said, the neat perfume may further comprise free perfume raw materials that do comprise aldehyde and/or ketone moieties.

The treatment compositions of the present disclosure may, additionally or alternatively, comprise a perfume delivery system. Such perfume delivery systems may take the form of a polymer-assisted delivery system. Such perfume delivery systems may take the form of an encapsulate, for example a core-shell encapsulate, where the core comprises perfume raw materials and is surrounded by a polymeric shell. The polymeric shell may comprise polymeric material derived from polyacrylates, polyurea, polyurethanes, polysaccharides, polyvinyl alcohol, melamine, derivatives thereof, or combinations thereof. Additionally or alternatively, suitable perfume delivery systems may include known pro-perfume/pro-fragrance materials.

Other Materials

The treatment compositions, and/or even the premix compositions, of the present disclosure may comprise unreacted reactants and/or degradation products of the pro-benefit-agent compounds described herein. For example, the treatment compositions and/or premix compositions of the present disclosure may comprise: precursors or derivatives of the carbon-containing core alone, such as parent amino acids (e.g., H2-A-H, where A is substantially as defined above according to Formula III, where G=oxygen); hydrophobically modified amino acids (e.g., H2-A-Q, where A is substantially as defined above according to Formula III); free forms of the hydrophobe (e.g., H-G-Q, such as fatty alcohols like Dodecanol); forms of the pro-benefit-agent compounds that are free of the hydrophobe (e.g., Z-A-H, where A is substantially as defined above according to Formula III, where G=oxygen); free benefit agents, such as aldehyde- or ketone-containing PRMs; or combinations thereof Method of Making a Treatment Composition The present disclosure relates to processes for making any of the compositions described herein. The process of making a treatment composition, which may be a consumer product, may comprise the step of combining a pro-benefit-agent compound as described herein with an adjunct material as described herein.

The pro-benefit-agent compound may be combined with such adjunct materials by methods that include mixing and/or spraying.

The compositions of the present disclosure can be formulated into any suitable form and prepared by any process chosen by the formulator. The pro-benefit-agent compounds and adjunct materials may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, high shear mixers, static mixers, plough shear mixers, ribbon blenders, vertical axis granulators and drum mixers, both in batch and, where available, in continuous process configurations, spray dryers, and extruders.

For example, the method of making a treatment composition may include the step of combining a pro-benefit-agent compound according to the present disclosure with a base composition, preferably a liquid base composition, where the base composition comprises an adjunct ingredient. This process may occur, for example, in a batch process or in an in-line mixing process, preferably an in-line mixing process.

The method of making a treatment composition may include the step of combining a pro-benefit-agent precursor compound, a benefit agent, and an adjunct ingredient, as described herein. Preferably, the adjunct ingredient is part of a base composition, and the pro-benefit-agent precursor compound and the benefit agent are each added to the base composition as separate inputs. The separate inputs may be added sequentially (e.g. in series), or substantially simultaneously. Preferably, the base composition is a liquid. This process may occur, for example, in a batch process or in an in-line mixing process, preferably an in-line mixing process.

The method of making a treatment composition may include the step of adding a premix to a base composition. The premix composition may comprise a pro-benefit-agent precursor compound and a benefit agent, as described herein. The premix composition may be obtainable by combining a pro-benefit-agent precursor compound and a benefit agent, as described herein. The premix composition may include a pro-benefit-agent compound according to the present disclosure, for example due to the reaction of the precursor compound and the benefit agent. The premix composition may include a mixture of a pro-benefit agent precursor compound, a benefit agent, and a pro-benefit-agent compound. The premix may optionally contain water. This process may occur, for example, in a batch process or in an in-line mixing process, preferably an in-line mixing process. A premix may be particularly preferred when making a treatment composition that is in, or will be in solid form, such as a PEG-based pastille. In such cases, removal or reduction of water from the premix may be useful, for example via a water scavenger such as magnesium sulfate, or via the use of a molecular sieve or distilled off in vacuo.

Method of Treating a Surface

The present disclosure further relates to methods of treating a surface (for example, a surface of an article) with a treatment composition according to the present disclosure. Such methods may provide cleaning, conditioning, hygienic, and/or freshening benefits.

Suitable surfaces may include fabrics (including clothing, towels, or linens), hard surfaces (such as tile, porcelain, linoleum or wood floors), dishware, hair, skin, or mixtures thereof.

The method may include a step of contacting an article or surface with a treatment composition of the present disclosure, optionally in the presence of water, optionally further including the step of rinsing and/or drying the article or surface The treatment composition may be in neat form or diluted in a liquor, for example, a wash or rinse liquor. The treatment composition may be diluted in water prior, during, or after contacting the surface or article. The surface, or an article comprising such a surface, may be optionally washed and/or rinsed before and/or after the contacting step.

The method of treating and/or cleaning a surface may include the steps of:
a) optionally washing, rinsing and/or drying the surface;
b) contacting the surface with a treatment composition as described herein, optionally in the presence of water;
c) optionally washing and/or rinsing the surface; and
d) optionally drying the surface by drying passively and/or via an active method such as a laundry dryer.

For purposes of the present invention, washing includes but is not limited to, scrubbing, and mechanical agitation. The fabric may comprise most any fabric capable of being laundered or treated in normal consumer or industrial use conditions.

Liquors that may comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, when the surface is part of a fabric, the water to fabric weight ratio is typically from about 1:1 to about 30:1.

The present disclosure further discloses a process of treating a surface or article, preferably a fabric, with an aqueous treatment liquor that comprises a pro-benefit-agent compound according to the present disclosure, preferably where the benefit agent fragment is a fragment of a perfume raw material or an antimicrobial agent, preferably a fragment of a perfume raw material. The process may include the step of contacting the surface or article, preferably a fabric, with the aqueous liquor. The pro-benefit-agent compound may be present in the aqueous liquor at a level of from about 0.001 ppm (e.g., 1 ppb) to about 1000 ppm by weight.

The present disclosure further discloses a process of treating a surface or article, preferably a fabric, with an aqueous treatment liquor that comprises the pro-benefit-agent precursor compound according to the present disclosure, and a benefit agent according to the present disclosure. The benefit agent may be a perfume raw material or an antimicrobial agent, preferably perfume raw material. The process may include the step of contacting the surface or article, preferably a fabric, with the aqueous liquor. The pro-benefit-agent precursor compound may be present in the aqueous liquor at a level of from about 0.001 ppm (e.g., 1 ppb) to about 1000 ppm by weight.

Use

The present disclosure relates to the use of the presently described pro-benefit-agent compounds for providing a freshness benefit when the pro-benefit-agent compound comprises a fragment of a perfume raw material, particularly when part of a treatment composition.

The present disclosure relates to the use of the presently described pro-benefit-agent compounds for providing an antimicrobial benefit when the pro-benefit-agent compound comprises a fragment of an antimicrobial agent, particularly when part of a treatment composition.

The present disclosure relates to the use of the presently described pro-benefit-agent compounds for providing an anti-malodor benefit, particularly when part of a treatment composition.

Combinations

Specifically contemplated combinations of the disclosure are herein described in the following lettered paragraphs. These combinations are intended to be illustrative in nature and are not intended to be limiting.

A. A pro-benefit-agent compound, wherein the compound comprises: a carbon-containing core, the carbon-containing core comprising a carbon backbone, one or more side groups, a nitrogen atom, and a carbonyl group, wherein the carbonyl group is part of a carbonyl-containing moiety that is selected from an ester moiety, an amide moiety, or a thioester moiety, wherein the carbonyl-containing moiety comprises a heteroatom joined to the carbon of the carbonyl group, wherein the heteroatom is selected from oxygen, nitrogen, or sulfur, wherein the carbonyl-containing moiety further comprises a hydrophobic moiety joined to the heteroatom, wherein the hydrophobic moiety is an organic group comprising 5 to 34 chain atoms, preferably carbon chain atoms; and a benefit agent fragment joined to the core by a linking bond that is a single bond or a double bond, the linking bond being between the nitrogen atom of the carbon-containing core and a carbon atom of the benefit agent fragment, the single bond, if present, having been formed by a 1,4-addition process, the double bond, if present, being part of an imine bond, wherein when the linking bond cleaves, a benefit agent is released, the benefit agent comprising an aldehyde moiety, a ketone moiety, or combinations thereof.

B. The pro-benefit-agent compound according to paragraph A, wherein the carbon backbone comprises from one to six carbon atoms, preferably from one to three carbon atoms, more preferably one carbon atom.

C. The pro-benefit-agent compound according to any of paragraphs A or B, wherein the carbon-containing core is derived from an amino acid, preferably a proteinogenic amino acid, even more preferably a proteinogenic amino acid selected from the group consisting of valine, phenylalanine, leucine, isoleucine, or combinations thereof, more preferably valine, phenylalanine, or combinations thereof.

D. The pro-benefit-agent compound according to any of paragraphs A-C, wherein at least one side group has the structure of a side group of a proteinogenic amino acid or a derivative thereof, preferably the side group of a proteinogenic amino acid selected from the group consisting of valine, phenylalanine, leucine, isoleucine, a derivative thereof, or combinations thereof, more preferably valine, phenylalanine, a derivative thereof, or combinations thereof.

E. The pro-benefit-agent compound according to any of paragraphs A-D, wherein the carbonyl-containing moiety is an ester moiety.

F. The pro-benefit-agent compound according to any of paragraphs A-E, wherein the hydrophobic moiety is an organic group comprising from about 8 to about 18 chain atoms, preferably from about 8 to about 14 chain atoms, more preferably carbon chain atoms.

G. The pro-benefit-agent compound according to any of paragraphs A-F, wherein the hydrophobic moiety is an unsubstituted organic group, an unbranched organic group, or a combination thereof, preferably a combination thereof.

H. The pro-benefit-agent compound according to any of paragraphs A-G, wherein the hydrophobic moiety comprises a second fragment of a second benefit agent, preferably wherein the second benefit agent is a perfume raw material, more preferably wherein the second benefit agent is an alcohol-containing perfume raw material.

I. The pro-benefit-agent compound according to any of paragraphs A-H, wherein the benefit agent fragment is derived from a benefit agent that comprises an aldehyde moiety.

J. The pro-benefit-agent compound according to any of paragraphs A-I, wherein the benefit agent fragment is derived from a benefit agent that comprises a ketone moiety.

K. The pro-benefit-agent compound according to any of paragraphs A-J, wherein the benefit agent fragment is derived from a benefit agent that is selected from a perfume raw material, an antimicrobial agent, a pesticide, an insect repellant, an anti-fungal agent, a herbicidal agent, a hueing dye, an antioxidant, a non-perfume organoleptic, or a combination thereof, preferably a perfume raw material, an antimicrobial agent, or combinations thereof, more preferably a perfume raw material.

L. The pro-benefit-agent compound according to any of paragraphs A-K, wherein the benefit agent is a perfume raw material, preferably a perfume raw material selected from the group consisting of: methyl nonyl acetaldehyde: benzaldehyde; floralozone; isocyclocitral; triplal (ligustral); pre-cylcemone B; lilial; decyl aldehyde; undecylenic aldehyde; cyclamen homoaldehyde; cyclamen aldehyde; dupical; oncidal; adoxal; melonal; calypsone; anisic aldehyde; heliotropin; cuminic aldehyde; scentenal; 3,6-dimethylcyclohex-3-ene-1-carbaldehyde; satinaldehyde; canthoxal; vanillin; ethyl vanillin; cinnamic aldehyde; cis-4-decenal; trans-4-decenal; cis-7-decenal; undecylenic aldehyde; trans-2-hexenal; trans-2-octenal; 2-undecenal; 2,4-dodecadeienal; cis-4-heptenal; Florydral; butyl cinnamaldehyde; limonelal; amyl cinnamaldehyde; hexyl cinnamaldehyde; citronellal; citral; cis-3-hexen-1-al; nerolione; 4-(4-methoxyphenyl)butan-2-one; 1-naphthalen-2-ylethanone; nectaryl; trimofix O; fleuramone; delta-damascone; beta-damascone; alpha-damascone; methyl ionone; 2-hexylcyclopent-2-en-1-one; galbascone; and mixtures thereof; more preferably wherein the hydrophobic moiety is an organic group comprising from about 8 to about 18 chain atoms, preferably wherein the chain atoms are carbon atoms.

M. The pro-benefit-agent compound according to any of paragraphs A-L, wherein the benefit agent is an antimicrobial agent, preferably an antimicrobial agent selected from acetylacetone enolate, gossypol, nootkatone, or mixtures thereof, more preferably wherein the hydrophobic moiety is an organic group comprising from about 6 to about 12 chain atoms, preferably wherein the chain atoms are carbon atoms.

N. The pro-benefit-agent compound according to any of paragraphs A-M, wherein the pro-benefit agent compound is characterized by a structure according to Formula I:

$$Z**A-Q \qquad \text{Formula I}$$

wherein A represents the carbon-containing core, wherein Z is the benefit agent fragment, wherein ** represents the linking bond between a nitrogen atom of the A group and a carbon atom of the Z group, wherein the linking bond is one of (a) a double bond, thereby forming an imine bond, or (b) a single bond formed from a 1,4-addition when the benefit agent from which the benefit agent fragment is derived comprises an alpha-beta unsaturated carbonyl-containing moiety that is an aldehyde moiety or a ketone moiety; wherein Q is the hydrophobic moiety and is a monovalent organic group.

O. The pro-benefit-agent compound according to paragraph N, wherein the compound is characterized by a structure according to Formula II:

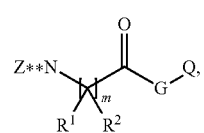

Formula II wherein G is selected from —O—, —S—, or —N($R^3$)—, preferably wherein G is —O—, wherein $R^3$, if present, is selected from —H or a monovalent moiety with a molecular weight of from about 15 to about 142 Da, preferably wherein $R^3$ is selected from —H or a monovalent moiety with a molecular weight from about 15 to about 30 Da, more preferably wherein $R^3$ is —H; wherein Q comprises 5 to 34 chain atoms, preferably from about 8 to about 18 chain atoms, more preferably from about 8 to about 14 chain atoms; wherein $R^1$ and $R^2$ are independently selected from —H or a monovalent moiety with a molecular weight of from about 15 to about 1000 Da, preferably independently selected from —H or a monovalent moiety with a molecular weight of from about 15 to about 507 Da, more preferably independently selected from —H or a monovalent moiety with a molecular weight of from about 15 to about 142 Da; wherein when ** represents a single bond, the nitrogen atom is further bonded to a hydrogen (—H); wherein the index m is from one to six, preferably m is from one to three, more preferably m is one.

P. The pro-benefit-agent compound according to paragraph 0, wherein: G=—O—; m=1; $R^1$ has the structure of a side group of a proteinogenic amino acid; $R^2$ is —H; Z is a fragment of a perfume raw material; and Q is an organic group comprising from about 8 to about 18 chain atoms, preferably wherein the chain atoms are carbon atoms.

Q. A treatment composition comprising an adjunct ingredient and the pro-benefit-agent compound according to any of paragraphs A-P.

R. The treatment composition according to paragraph Q, wherein the adjunct ingredient comprise one or more of the following: surfactants, conditioning actives, deposition aids, rheology modifiers or structurants, antioxidants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, perfume delivery systems, structure elasticizing agents, carriers, hydrotropes, processing aids, anti-agglomeration agents, coatings, formaldehyde scavengers, and/or pigments.

S. The treatment composition according to any of paragraphs Q or R, wherein the adjunct ingredient comprises a conditioning active, preferably wherein the conditioning active comprises quaternary ammonium ester compounds, more preferably wherein the quaternary ammonium ester compounds are present at a level of from about 2 wt % to about 35 wt %, preferably from about 4 wt % to about 25 wt %, more preferably from about 5 wt % to about 20 wt %, preferably from about 6 wt % to about 15 wt %, more preferably from about 7 wt % to about 12 wt %, by weight of the treatment composition.

T. The treatment composition according to any of paragraphs Q-S, wherein the treatment composition further comprises neat perfume, preferably neat perfume that comprises an alcohol-containing perfume raw material.

U. The treatment composition according to any of paragraphs Q-T, wherein the treatment composition is a consumer product, preferably a consumer product selected from a fabric care composition, a hard surface cleaner composition, a dish care composition, a hair care composition, a body cleansing composition, or a mixture thereof.

V. The treatment composition according to any of paragraphs Q-U, wherein the treatment composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam or mousse, a non-woven sheet, or a mixture thereof.

W. The treatment composition according to any of paragraphs Q-V, wherein the pro-benefit-agent compound is present in the treatment composition at a level of from about 0.001% to about 30%, by weight of the treatment composition.

X. A premix composition comprising: a pro-benefit-agent precursor compound, wherein the precursor compound comprises a carbon-containing core, the carbon-containing core comprising a carbon backbone, one or more side groups, a nitrogen atom, and a carbonyl group, wherein the carbonyl group is part of a carbonyl-containing moiety that is selected from an ester moiety, an amide moiety, or a thioester moiety, wherein the carbonyl-containing moiety comprises a heteroatom joined to the carbon of the carbonyl group, wherein the heteroatom is selected from oxygen, nitrogen, or sulfur, wherein the carbonyl-containing moiety further comprises a hydrophobic moiety joined to the heteroatom, wherein the hydrophobic moiety is an organic group comprising 5 to 34 chain atoms; and a benefit agent, the benefit agent comprising an aldehyde moiety, a ketone moiety, or combinations thereof, wherein the pro-benefit-agent precursor and the benefit agent may optionally react to form a pro-benefit agent compound according to any of paragraphs A-P, wherein the sum of the weight percents of the pro-benefit-agent precursor, the benefit agent, and the pro-benefit-agent compound, if present, is from about 10% to about 100%, preferably from about 25% to about 100%, more preferably from about 50% to about 100%, even more preferably from about 75% to about 100%, by weight of the premix composition.

Y1. The premix composition according to paragraph X, wherein the premix composition further comprises water, preferably wherein the premix composition is in the form of an emulsion, more preferably an oil-in-water emulsion.

Y2. The premix composition according to paragraph X, wherein the premix composition comprises less than about 10%, preferably less than 5%, more preferably less than 1%, even more preferably less than 0.10% water, by weight of the premix composition.

Z. The premix composition according to any of paragraphs X, Y1, or Y2, wherein the molar ratio of the pro-benefit-agent precursor compound and the benefit agent is from about 3:1 to about 1:3, preferably from about 2:1 to about 1:2, more preferably from about 1.5:1 to about 1:1.5, more preferably from about 1.2:1 to about 1:1.2, even more preferably from about 1:1.

AA. A method of making a treatment composition according to any of claims Q-W, wherein the method comprises at least one of the following: (a) combining a pro-benefit-agent compound with an adjunct ingredient, preferably wherein the adjunct ingredient is part of a base composition; (b) combining a premix composition according to any of claims X-Z with an adjunct ingredient, preferably wherein the adjunct ingredient is part of a base composition; (c) combining a pro-benefit-agent precursor compound, a benefit agent, and an adjunct ingredient, preferably wherein the adjunct ingredient is part of a base composition and the pro-benefit-agent precursor compound and the benefit agent are each added to the base composition as separate inputs.

BB. A method of treating an article or a surface, wherein the method comprises treating the article or surface with a treatment composition according to any of paragraphs Q-W, optionally in the presence of water, optionally further including the step of rinsing and/or drying the article or surface.

Test Methods

Preparation of a Premix Fluid (e.g., Nil-Water)

A premix fluid may be prepared as follows.
Method A: A benefit agent that comprises an aldehyde or ketone moiety is added in an approximately equal molar equivalent to the molar concentration of amine radicals present in a precursor compound (e.g., a precursor compound to Formula I above). This material is stirred with a magnetic stir bar at 150 rpm for at least 12 h.

Method B: A benefit agent that comprises an aldehyde or ketone moiety is added in an approximately equal molar equivalent to the molar concentration of amine radicals present in a precursor compound (e.g., a precursor compound to Formula V above). This material is stirred with a magnetic stir bar at 150 rpm for at least 12 h in the presence of a water scavenger. The resulting fluid can either be mechanically filtered or directly added to a treatment composition.

As an illustrative example, 59 parts by weight of a modified amino acid as disclosed in Synthesis Example 3A below, is combined with 41 parts of a benefit agent (e.g., cyclamen aldehyde) using an IKA RW 20 D Sl Mixer, Model RW20DS1, and IKA RI 342 impeller blade at 350 rpm.

Preparation of a Premix Emulsion (e.g., with Water)

A premix emulsion may be prepared as follows.
Method A: Starting with 1 part by weight of the premix fluid provided in the previous example, add diethylene glycol monobutyl ether (10.0 parts; ex TCI) and ECOSURF™ EH-9 (1 part; ex The Dow Chemical Company). The mixture is added to a Flacktek DA150.FVZ-K speed mixer for 1 min at 3,500 rpm. Water (88 parts in total) is added in two equal, separate additions; after each water addition, the mixture is mixed with the a Flacktek DA150.FVZ-K speed mixer at 3,500 rpm for 10-15 min.
Method B: Starting with 1 part by weight of the precursor compound (e.g., a hydrophobically modified amino acid), add diethylene glycol monobutyl ether (10.0 parts; ex TCI) and ECOSURF™ EH-9 (1 part; ex The Dow Chemical Company). The mixture is added to a Flacktek DA150.FVZ-K speed mixer for 1 min at 3,500 rpm. Water (88 parts in total) is added in two equal, separate additions; after each water addition, the mixture is mixed with the a Flacktek DA150.FVZ-K speed mixer at 3,500 rpm for 10-15 min. A benefit agent is added in an approximately equal molar equivalent to the molar concentration of amine radicals present in the precursor compound.

As an illustrative example, 99 parts by weight of an emulsified fluid containing a modified amino acid (which includes about 1 part by weight of the modified amino acid) as disclosed in Synthesis Example 1 below, emulsified as described above, is combined with 1 part of a benefit agent (e.g., cyclamen aldehyde).

Preparation of a Test Fabric Enhancer/Softener Composition

A 7.5 wt % N,N-di(tallowoyloxyethyl)-N,N-dimethylammonium chloride in water mixture is provided. A premix fluid as described above, a premix emulsion as described above, or two discrete neat fluids (one being the pro-benefit-agent precursor, such as a modified amino acid; the other being the benefit agent, such as one or more perfume raw materials) are added in an amount such that the concentration of the benefit agent or benefit material fragment in the fabric softener is about 0.3 wt % of the final fabric softener composition. The mixture is stirred for 5 min with an IKA RW 20 D Sl Mixer, Model RW20DS1, and IKA RI 342 impeller blade at 350 rpm. A structurant and a deposition aid is added, and the mixture is stirred for 10 min. Water is added if needed to standardize the concentration of N,N di(tallowoyloxyethyl)-N,N dimethylammonium chloride amongst test legs to 7.3 wt %, and the mixture stirred for 5 min. The pH is adjusted to 2-3 with HCl, if necessary.

Preparation of a Test Pastille Composition

A mixture of 92.59 parts by weight of molten PEG-8000 material and 6.00 parts by weight of a perfume accord is provided. In a speed mixer cup, 0.59 parts by weight of the pro-benefit-agent premix fluid of Synthetic Example 1 is added. The speed mixer cup is quickly placed in a Flacktek DA150.FVZ-K speed mixer for 1 min at 3500 rpm. Sample pastilles are immediately made from the mixture by pouring into blue siliconized rubber molds that are pre-equilibrated to 4° C. and spread with a 10" plastic taping knife. The pastilles are cooled at room temperature for approximately 30 min, then the pastilles are removed from the mold and stored under ambient conditions.

Preparation of a Test Fabric Detergent Composition

To 97.58 parts by weight of TIDE Original Scent liquid detergent is added 2.42 parts by weight of the pro-benefit-agent-compound premix fluid of Synthetic Example 3B. The amount is selected such that the concentration of the selected benefit agent or benefit material fragment in the final detergent is about 1 wt % after the fabric treatment composition. The mixture is stirred for 10 min with an IKA RW 20 D Sl Mixer, Model RW20DS1, and IKA RI 342 impeller blade at 350 rpm.

Preparation of a Dishwashing Liquid Detergent 0.6 parts by weight of a pro-benefit-agent compound premix fluid are added to 99.4 parts by weight of Ultra Dawn Blue Dishwashing Liquid. The pro-benefit-agent amino acid ester is added in an amount such that the concentration of the benefit agent or benefit material fragment in the dishwashing liquid is about 0.2 wt % after composition. The mixture is mixed for 1 hour on a Thermo Scientific Tube Roller, Model No. 88881003, and at 80 rpm.

Fabric Preparation Method

To prepare fabrics for Headspace analysis testing, fabric samples (100% Cotton Terry Cloth, Item Number ITL 1022-15PGP, CalderonTextiles, Inc. 6131 W. 80 tA St., Indianapolis, Ind. 46278, Desized and conditioned with 3 wash cycles of Detergent and Fabric Softener) are treated with the detergents or fabric conditioners in a manner consistent with North American consumers via clothes mini-washing machines, full scale machines, and clothes dryers. Fabric are equilibrated at 21.1° C. and 50% relative humidity for 12 to 24 hours, unless noted otherwise, prior to Headspace GCMS analysis (see methods below). Ballast loads are comprised of cotton and polycotton knit swatches approximately 20×20 inches (50×50 cm) in size.

Wash Treatment Conditions

In the fabric enhancer/softener compositions performance tests below, the fabrics are treated with the following wash treatment conditions: Wash: 12 min agitation, 30.6° C. Rinse: 2 min agitation, 15.5° C. Water Hardness: 137 ppm. Water: 7.6 pH. Fabric Load Weight: 290 g. Tumble Dry Setting: 50 min High, Cotton. Detergent Dose: 9.65 g. Fabric Softener Dose: 5.71 g.

In the pastille composition performance tests below, the fabrics are treated with the following wash treatment conditions: North America Kenmore 600 Series top-loading washing machines are used. Each machine is set to run a Normal single cycle including a 12-minute wash agitation period, and 1 three-minute rinse. The water used is 137 ppm hardness and 30.6° C. for the wash, and 15.5° C. for the rinse. The water volume at each step is 64 Liters. The total fabric load weight is 3.6 kg (which included 32 test fabric hand towel terry cloths, 9 of 100% cotton ballast, and about 5 of 50/50 polycotton ballast). The detergent used is TIDE Original Scent liquid without perfume (produced by The Procter & Gamble Company). Detergent is dosed at 81 g into the wash water while the wash water is filling. After the detergent is added, 25 g of the pastilles being evaluated are also added, followed by the fabric load. After the water fill is complete, the machine enters the agitation period. This is followed by the wash agitation (Normal setting), and the rinse step (with corresponding spin cycle). After the wash process is completed, the fabrics are removed. The test fabrics are machine dried in Kenmore driers on Cotton/High setting, for 50 minutes or test fabrics are line-dried for 16 hours in a 21.1° C./50% relative humidity controlled room.

In the detergent composition performance tests below, the fabrics are treated with the following wash treatment conditions: Wash: 12 min agitation, 30.6° C. Rinse: 2 min agitation, 15.5° C. Water Hardness: 137 ppm. Water: 7.6 pH. Fabric Load Weight: 290 g. Tumble Dry Setting: 50 min High, Cotton. Detergent Dose: 9.65 g. Fabric Softener Dose: 5.71 g.

Headspace Analysis Above Fabrics

To determine the level of benefit agent material in the headspace above a fabric, the following procedure is used.

The following equipment is used: Gas Chromatograph 7890B equipped with a Mass Selective Detector (5977B) (MSD) and Chemstation quantitation package; Gerstel Multi-Purpose sampler equipped with a solid phase microextraction (SPME) probe or similar system; Divinylbenzene/Carboxen/Polydimethylsiloxane SPME fiber from Supleco part #57298-U (or similar fiber); 30 m×0.25 mm nominal diameter, 0.25 m film thickness, J&W 122-5532UI DB-5; 20 mL headspace vials.

To prepare the fabric for analysis, cut three 2.54 cm×5.08 cm cotton swatches from the cotton terry that is prepared and treated according to the above methods. Place each piece in a 20 mL headspace vial and cap.

The Gerstel auto sampler parameters are as follows: SPME—from Incubator; Incubation Temperature—65° C.; Incubation Time—10.00 min SAMPLE PARAMETERS; Vial Penetration—22.00 mm; Extraction Time—5.00 min; Ii. Penetration—54.00 mm; Desorption Time—300 s. The GC oven parameters are as follows for the Front SS Inlet He: Mode—Splitless; Heater—270° C.; GC Run Time—14.28 min. For the Oven: Initial temp.—40° C.; Hold Time—0.5 min; Heating Program—Rate of 17° C./min, Temp of 270° C., Hold Time of 0.25 min. The MSD parameters are as follows: Run in scan mode with a minimum range of 35 to 350 m/z.

Calibration curves are generated from the standards benefit agent material. Chemstation software (or similar quantitation software) calculates the mass amount in the headspace using the calibration curve for each perfume component.

Color Change of a Composition

A treatment composition may be tested for color changes according to the following procedure. The reflectance spectra and color measurements, including L*, a*, and b* were made using the LabScan XE reflectance spectrophotometer (HunterLabs, Reston, VA; D65 illumination, 10° observer, UV light excluded). L*, a* and b* values for treatment compositions are measured at time $t_{initial}$, i.e. start of test, after mixing in the benefit agent, and $t_{final}$, i.e. end of the stability test as defined in each experiment. The total color change ($\Delta E$) of a treatment composition is calculated based on the data collected at each time point t using the following equation:

$$\Delta Et = [(L^*_c - L^*_s)^2 + (a^*_c - a^*_s)^2 + (b^*_c - b^*_s)^2]^{1/2}$$

wherein the subscripts c and s respectively refer to the control, i.e., the treatment composition with nil benefit agent, and the sample, i.e., the treatment composition with respective aldehyde/ketone benefit agent, where the values used to calculate $\Delta Et$ are those at the corresponding time points $t_{initial}$ and $t_{final}$.

Samples were prepared by adding the pro-benefit-agent fluid premix (nil-water) to a base treatment composition with overhead mixing with a fourblade IKA RW 20 impeller and gently mixed for 15 minutes. The treatment composition is placed into a 50 mL (25 cm$^2$) CELLSTAR® cell culture flask with standard screw cap. At $t_{initial}$ and after $t_{final}$ at the specified temperature, color appearance of each treatment composition sample is measured on a LabScan XE 10 reflectance spectrophotometer (HunterLabs, Reston, VA; D65 illumination, 10° observer, UV light excluded).

HLB Value of Nonionic Surfactants

Nonionic surfactants can be classified by the balance between the hydrophilic and lipophilic moieties in the surfactant molecule. The hydrophile-lipophile balance (HLB) scale devised by Griffin in 1949 is a scale from 0-20 (20 being Hydrophilic) used to characterize the nature of surfactants. The HLB of a surfactant may be calculated as follows:

$$HLB = 20 * Mh/M$$

where Mh is the molecular of the hydrophilic portion of the molecule, and M is the molecular mass of the whole molecule, giving a result on a scale of 0 to 20. An HLB value of 0 corresponds to a completely lipophilic/hydrophobic molecule, and a value of 20 corresponds to a completely hydrophilic/lipophobic molecule. See Griffin, W. C. Calculation of HLB values of Nonionic Surfactants, J. Soc. Cosmet. Chem. 1954, 5, 249-256. The HLB values for commonly-used surfactants are readily available in the literature (e.g., HLB Index in McCutcheon's Emulsifiers and Detergents, MC Publishing Co., 2004). The HLB value for a mixture of surfactants can be calculated as a weighted average of the HLB values of the surfactants.

Test Method for Determining logP

The value of the log of the Octanol/Water Partition Coefficient (logP) is computed for a material (such as the alcohol version of a hydrophobe/Q group, or of a PRM) as described here.

The logP of an individual material is calculated using the Consensus logP Computational Model, version 14.5 (Linux) available from Advanced Chemistry Development Inc. (ACD/Labs) (Toronto, Canada) to provide the unitless logP value. The ACD/Labs' Consensus logP Computational Model is part of the ACD/Labs model suite.

Examples

The examples provided below are intended to be illustrative in nature and are not intended to be limiting.

Synthesis Examples

The following Synthetic Examples 1-17 exemplify the synthesis of illustrative pro-benefit-agent compounds (e.g., Synthetic Example 1) and their amine-containing precursor (e.g., Synthetic Example 1'), according to the present disclosure.

Comparative Synthetic Example A shows a comparative amino-modified silicone polymer that does not include a small molecule amino acid ester moiety as provided in the present disclosure. Comparative Synthetic Examples B and C are modified amino acid esters, derived from materials that fall outside of the present invention.

For consistency and illustrative/comparative purposes, each example reacts a different neat pro-fragrance precursor molecule with the same perfume raw material, cyclamen aldehyde (containing an aldehyde moiety), which has the following structure. As an additional example (one formed through 1,4 addition), Synthetic Example 3B forms a pro-benefit-agent compound with delta-damascone, which contains a ketone moiety. The structures of the PRMs are provided below:

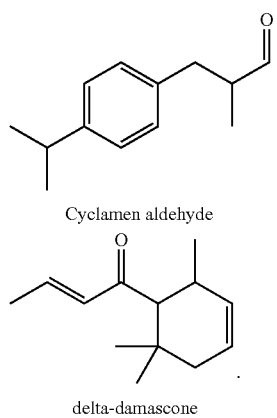

Cyclamen aldehyde delta-damascone

However, it is understood that other aldehyde- or ketone-containing benefit agents according to the present disclosure may also lead to the formation of suitable pro-benefit-agent compounds; some of these are exemplified and tested in the Performance Examples below.

It is also understood that the Synthetic Examples may be formulated into a treatment composition as a liquid premix emulsion or as a neat fluid or as a liquid premix fluid as described above; however, for the case of the reported performance and stability examples below, all Synthetic Examples are assumed to be formulated directly as liquid premix fluids into the treatment composition unless indicated otherwise.

For each Synthetic Example, the resulting pro-benefit-agent compound (e.g., a modified amino acid ester molecule) is illustrated with cyclamen aldehyde (or in the case of Synthetic Example 3B, delta-damascone) and provided below in Table D. Comparative Synthetic Example A, a silicone-based pro-perfume, is exemplified with cyclamen aldehyde in Table D, although it does not contain the hydrophobic pro-benefit amino acid ester, nor would it be considered a small molecule by those skilled in the art.

Comparative Synthetic Example A

Cyclamen Aldehyde (0.35 g; available from Symrise, Holzminden, Germany) is added to an amino-modified silicone (A'), KF-8003 (5 g, available from Shin-Etsu Silicones of America Inc., Akron, OH). The mixture is stirred for 12 h. The resulting clear fluid (Synthetic Example A) is analyzed by $^1$H NMR.

As shown in Table D below, the resulting material of Comparative Synthetic Example A does not include the hydrophobic ester moiety according to the present disclosure.

Materials used in both Performance and Stability examples were based on an emulsified silicone system as exemplified here. Starting with 60.0 parts by weight of the KF-8003 compound, add Surfonic L24-9 (2.0 parts; ex Huntsman Holland BV) and Tergitol™ 15-S-40 (2.5 parts; ex The Dow Chemical Company). The mixture is mixed for 1 minute with an IKA RW 20 at 800 rpm. Water (35.5 parts in total) is added in two equal, separate additions; after each water addition, the mixture mixed with the IKA RW 20 for approximately 10-15 min.

Benefit agents are then added to the emulsion in an approximately equal molar equivalent to the molar amount amine in the KF-8003 silicone polymer and stirred for 15 minutes with an IKA RW 20 at 275 rpm. As an illustrative example, 93.5 parts by weight of a silicone fluid as disclosed in above, emulsified as described above, is combined with 6.5 parts of a perfume raw material (e.g., cyclamen aldehyde).

Comparative Synthetic Examples B and C

Methyl or ethyl esters of amino acids (available from Sigma-Aldrich) are provided and neutralized. Comparative pro-benefit-agent compounds are then made according to General Method B, as provided below.

Methods of Preparing Pro-Benefit-Agent Compounds (e.g., Modified Amino Acid Esters)

In the following synthesis examples, the materials are generally obtained/available from Sigma-Aldrich (St. Louis, Mo., USA), except as indicated below. The amino acids are generally provided at >98% or even >99% purity. The alcohols are generally provided at >97%, >98%, or even >99% purity. Cyclamen aldehyde (ex Sigma-Aldrich) is provided at >95% purity. δ-Damascone is available from Firmenich of Geneva, Switzerland. C10PO1 was prepared from the propoxylation of decanol. ISALCHEM 123 and NEODOL 123 were obtained by Sasol (Viale Forlanini, Milano, Italy)

General Method A: General Preparation of Precursor Compound (e.g., an Amino Acid Ester)

To prepare a pro-benefit-agent precursor compound from an amino acid and an alkyl alcohol, a round bottom flask is charged with 1 equiv. of a free base amino acid starting material. To the flask is added 1 equiv. of an alcohol followed and 1.2 equiv. of p-Toluene-sulfonic acid monohydrate (PTSA) or Methanesulfonic acid (MsOH). The flask is then diluted with benzene and refluxed for 12 h using a dean-stark apparatus. Solvent is removed in vacuo and the resulting crude material dissolved in chloroform. The solution is neutralized with Et$_3$N, then washed 3× with NaHCO$_3$, and dried over MgSO$_4$. Solvent is removed and the washed material is diluted with cyclohexane, stored at 0° C. for 12 h. The eluent is collected yielding the desired modified amino acid ester.

General Method B: General Preparation of Pro-Benefit-Agent Compound

A round bottom flask is charged with 1 equiv. of a modified amino acid ester precursor. To the flask is added 1 equiv. of either cyclamen aldehyde or 6-damascone. To the fluid is added 20 wt % 4 Å molecular sieves and the mixture stirred for 12 h. The resulting mixture is filtered using a Pyrex 36060-30M Brand 36060 fritted funnel and used directly.

Synthetic Example 1

Synthetic Example 1' was prepared as described in General Method A, but using 10.0 g of Glycine, 24.8 g of 1-Dodecanol, and 30.4 g PTSAH$_2$O. The isolated solid of Synthetic Example 1' was then mixed with cyclamen aldehyde (≥95%, Sigma-Aldrich, St. Louis, MO) as described in General Method B yielding Synthetic Example 1. The independent fluid 1 appears stable for several months by $^1$H NMR.

Synthetic Example 2

Synthetic Example 2' was prepared as described in General Method A, but using 10.0 g of L-Alanine, 21.0 g of 1-Dodecanol, and 25.6 g PTSAH$_2$O. The isolated fluid of Synthetic Example 2' was then mixed with cyclamen aldehyde as described in General Method B yielding Synthetic Example 2. The independent fluid 2 appears stable for several months by $^1$H NMR.

Synthetic Example 3A

Synthetic Example 3' was prepared as described in General Method A, but using 10.0 g of L-Valine, 16.1 g of 1-Dodecanol, and 19.5 g PTSAH$_2$O. The isolated fluid of Synthetic Example 3' was then mixed with cyclamen aldehyde as described in General Method B yielding Synthetic Example 3A. The independent fluid 3A appears stable for several months by $^1$H NMR.

Synthetic Example 3B

Synthetic Example 3' was prepared as described in General Method A, but using 10.0 g of L-Valine, 16.1 g of 1-Dodecanol, and 19.5 g PTSAH$_2$O. The isolated fluid of Synthetic Example 3' was then mixed with 6-Damascone as described in General Method B yielding Synthetic Example 3B. The independent fluid 3B appears stable for several months by $^1$H NMR.

Synthetic Example 4

Synthetic Example 4' was prepared as described in General Method A, but using 10.0 g of L-Valine, 11.1 g of 1-Octanol, and 19.5 g PTSAH$_2$O. The isolated fluid of Synthetic Example 4' was then mixed with cyclamen aldehyde as described in General Method B yielding Synthetic Example 4. The independent fluid 4 appears stable for several months by $^1$H NMR.

Synthetic Example 5

Synthetic Example 5' was prepared as described in General Method A, but using 10.0 g of L-Valine, 11.1 g of 2-Ethyl-1-hexanol, and 19.5 g PTSAH$_2$O. The isolated fluid of Synthetic Example 5' was then mixed with cyclamen aldehyde as described in General Method B yielding Synthetic Example 5. The independent fluid 5 appears stable for several months by $^1$H NMR.

Synthetic Example 6

Synthetic Example 6' was prepared as described in General Method A, but using 10.0 g of L-Valine, 11.1 g of 4-Octanol, and 19.5 g PTSAH$_2$O. The isolated fluid of Synthetic Example 6' was then mixed with cyclamen aldehyde as described in General Method B yielding Synthetic Example 6. The independent fluid 6 appears stable for several months by $^1$H NMR.

Synthetic Example 7

Synthetic Example 7' was prepared as described in General Method A, but using 10.0 g of L-Valine, 10.5 g of 4-Methylbenzyl alcohol, and 9.90 g of MsOH. The isolated fluid of Synthetic Example 7' was then mixed with cyclamen aldehyde as described in General Method B yielding Synthetic Example 7. The independent fluid 7 appears stable for several months by $^1$H NMR.

Synthetic Example 8

Synthetic Example 8' was prepared as described in General Method A, but using 10.0 g of L-Valine, 18.3 g of 1-Tetradecanol, and 19.5 g PTSAH$_2$O. The isolated fluid of Synthetic Example 8' was then mixed with cyclamen aldehyde as described in General Method B yielding Synthetic Example 8. The independent fluid 8 appears stable for several months by $^1$H NMR.

Synthetic Example 9

Synthetic Example 9' was prepared as described in General Method A, but using 10.0 g of L-Valine, 20.8 g of 1-Hexadecanol, and 19.5 g PTSAH$_2$O. The isolated solid of Synthetic Example 9' was then mixed with cyclamen aldehyde as described in General Method B yielding Synthetic Example 9. The independent fluid 9 appears stable for several months by $^1$H NMR.

Synthetic Example 10

Synthetic Example 10' was prepared as described in General Method A, but using 10.0 g of L-Valine, 23.0 g of 1-Octadecanol, and 19.5 g PTSAH$_2$O. The isolated solid of Synthetic Example 10' was then mixed with cyclamen aldehyde as described in General Method B yielding Synthetic Example 10. The independent fluid 10 appears stable for several months by $^1$H NMR.

Synthetic Example 11

Synthetic Example 11' was prepared as described in General Method A, but using 10.0 g of L-Tryptophan, 9.1 g of 1-Dodecanol, and 11.2 g PTSAH$_2$O. The isolated solid of Synthetic Example 11' was then mixed with cyclamen aldehyde as described in General Method B yielding Synthetic Example 11. The independent fluid 11 appears stable for several months by $^1$H NMR.

Synthetic Example 12

Synthetic Example 12' was prepared as described in General Method A, but using 10.0 g of L-Tyrosine, 10.3 g of 1-Dodecanol, and 12.6 g PTSAH$_2$O. The isolated solid of Synthetic Example 12' was then mixed with cyclamen aldehyde as described in General Method B yielding Synthetic Example 12. The independent fluid 12 appears stable for several months by $^1$H NMR.

Synthetic Example 13

Synthetic Example 13' was prepared as described in General Method A, but using 10.0 g of L-Aspartic Acid, 28 g of 1-Dodecanol corresponding to 2 equiv., and 17.2 g PTSAH$_2$O. The isolated solid of Synthetic Example 13' was then mixed with cyclamen aldehyde as described in General Method B yielding Synthetic Example 13. The independent fluid 13 appears stable for several months by $^1$H NMR.

Synthetic Example 14

Synthetic Example 14' was prepared as described in General Method A, but using 10.0 g of L-Methionine, 12.5 g of 1-Dodecanol, and 15.3 g PTSAH$_2$O. The isolated fluid of Synthetic Example 14' was then mixed with cyclamen aldehyde as described in General Method B yielding Synthetic Example 14. The independent fluid 14 appears stable for several months by $^1$H NMR.

Synthetic Example 15

Synthetic Example 15' was prepared as described in General Method A, but using 10.0 g of L-Phenylalanine, 11.3 g of 1-Dodecanol, and 13.8 g PTSAH$_2$O. The isolated fluid of Synthetic Example 15' was then mixed with cyclamen aldehyde as described in General Method B yielding Synthetic Example 15. The independent fluid 15 appears stable for several months by $^1$H NMR.

Synthetic Example 16

Synthetic Example 16' was prepared as described in General Method A, but using 10.0 g of L-Isoleucine, 14.2 g of 1-Dodecanol, and 17.4 g PTSAH$_2$O. The isolated fluid of Synthetic Example 16' was then mixed with cyclamen aldehyde as described in General Method B yielding Synthetic Example 16. The independent fluid 16 appears stable for several months by $^1$H NMR.

Synthetic Example 17

Synthetic Example 17' was prepared as described in General Method A, but using 10.0 g of L-Leucine, 14.2 g of 1-Dodecanol, and 17.4 g PTSAH$_2$O. The isolated fluid of Synthetic Example 17' was then mixed with cyclamen aldehyde as described in General Method B yielding Synthetic Example 17. The independent fluid 17 appears stable for several months by $^1$H NMR.

Synthetic Example 18

Synthetic Example 18' was prepared as described in General Method A, but using 10.0 g of L-Phenylalanine, 11.4 g of $C_{10}$PO1, and 13.8 g PTSAH$_2$O. The isolated fluid of Synthetic Example 18' was then mixed with cyclamen aldehyde as described in General Method B yielding Synthetic Example 18. The independent fluid 18 appears stable for several months by $^1$H NMR.

Synthetic Example 19

Synthetic Example 19' was prepared as described in General Method A, but using 10.0 g of L-Phenylalanine, 11.3 g of 2-dodecanol, and 13.8 g PTSAH$_2$O. The isolated fluid of Synthetic Example 19' was then mixed with cyclamen aldehyde as described in General Method B yielding Synthetic Example 19. The independent fluid 19 appears stable for several months by $^1$H NMR.

Synthetic Example 20

Synthetic Example 20' was prepared as described in General Method A, but using 10.0 g of L-Phenylalanine, 11.6 g of NEODOL 123, and 13.8 g PTSAH$_2$O. The isolated fluid of Synthetic Example 20' was then mixed with cyclamen aldehyde as described in General Method B yielding Synthetic Example 20. The independent fluid 20 appears stable for several months by $^1$H NMR.

Synthetic Example 21

Synthetic Example 21' was prepared as described in General Method A, but using 10.0 g of L-Phenylalanine, 11.6 g of ISALCHEM 123, and 13.8 g PTSAH$_2$O. The isolated fluid of Synthetic Example 21' was then mixed with cyclamen aldehyde as described in General Method B yielding Synthetic Example 21. The independent fluid 21 appears stable for several months by $^1$H NMR.

Synthetic Example 22

Synthetic Example 22' was prepared as described in General Method A, but using 10.0 g of L-Phenylalanine, 8.5 g of citronellol, and 13.8 g PTSAH$_2$O. The isolated fluid of Synthetic Example 22' was then mixed with cyclamen aldehyde as described in General Method B yielding Synthetic Example 22. The independent fluid 22 appears stable for several months by $^1$H NMR.

Synthetic Example 23

Method A: A stirred suspension of dodecylamine (5 g, 27 mmol) and L-Phenylalinine (2.2 g, 13 mmol) in tert-amyl methyl ether (TAME, 50 mL) with a Dean-Stark was heated to reflux and 1 equiv. of B(OCH$_2$CF$_3$)$_3$ (8.3 g, 27 mmol) was added through the Dean-Stark. A West condenser was fitted, and the reaction mixture stirred for 24 hours under N$_2$. Upon completion, the reaction mixture was concentrated in vacuo and dry loaded onto silica gel for column chromatography. After purification 23' was obtained as a powdery white solid. Method B: As described above for Method A, but with 1 equiv. of Ti(OiPr)$_4$ instead of B(OCH$_2$CF$_3$)$_3$.

The isolated solid of Synthetic Example 23' was then mixed with 6-Damascone as described in General Method B and the mixture diluted with 10 wt % EtOH yielding Synthetic Example 23. The independent fluid 23 appears stable for several months by $^1$H NMR.

Synthetic Example 24

Synthetic Example 24' was obtained from AstaTech, Inc (Bristol, PA, USA). Synthetic Example 24' was then mixed with cyclamen aldehyde as described in General Method B and 10 wt % EtOH yielding Synthetic Example 24. The independent fluid 24 appears stable for several months by $^1$H NMR.

Synthetic Example 25

To make Synthetic Example 25, the following procedure may be followed. Phenylalanine is combined with excess trisaminoborane derived from N-Methyldodecylamine (which may be prepared by treating $BF_3$ dissolved in ether with $C_6H_6$ solutions of a secondary amine in the presence of a Grignard reagent; see Angewandte Chemie (1956), 68, 619). The mixture is stirred at 21° C. in MeCN (0.5 M) for 12 h. Upon completion, the mixture is diluted with $CH_2Cl_2$ and an equivalent of water. Amberlite IRA-743 and Amberlyst A-26(OH) is added to the mixture and stirred for 30 min. The combined mixture is dried over $MgSO_4$ and filtered. The filtrate is reduced under reduced pressure and purified by column chromatography to obtain compound 25'. Isolated Synthetic Example 25' is mixed with cyclamen aldehyde as described in General Method B to obtain Synthetic Example 25.

Synthetic Example 26

To make Synthetic Example 26, the following procedure may be followed. Compound 26' is obtainable by repeating the preparation of compound 25' substituting Dibutylamine in place of N-methyldodecylamine. Isolated Synthetic Example 26' is mixed with cyclamen aldehyde as described in General Method B to obtain Synthetic Example 26.

Synthetic Example 27

To make Synthetic Example 27, the following procedure may be followed. Compound 27' is obtainable by repeating the preparation of compound 25' substituting Bis(2-ethylhexyl) amine in place of N-methyldodecylamine. Isolated Synthetic Example 27' is mixed with cyclamen aldehyde as described in General Method B to obtain Synthetic Example 27.

Structures of the Synthetic Examples

Table D below illustrates the structures of the Synthetic Examples 1-27, as well as their precursor compounds (denoted with a "'").

Table D also includes Comparative Synthetic Example A, a siloxane-based (S pro-perfume that includes an imine bond. Table D further includes Comparative Synthetic Examples B and C which are esterified amino acids, derived from materials that fall outside of the present invention; namely, the length of the hydrophobe is relatively short (one or two carbons, respectively). The comparative examples are marked with an asterisk (*).

TABLE D

Structural representation of the Synthesis Examples

| No. | Precursor Compound (e.g., before the addition of a benefit agent) | No. | Pro-Benefit-Agent Compound (e.g., a compound according to Formula 1, not including Comparative Examples A, B, and C) |
|---|---|---|---|
| A'* | (Si) structure with $NH_2$ | A* | (Si) structure with N=CH-linked cyclamen group |
| B'* | $H_2N$-valine methyl ester | B* | cyclamen-imine-valine methyl ester |
| C'* | $H_2N$-valine ethyl ester | C* | cyclamen-imine-valine ethyl ester |

TABLE D-continued

Structural representation of the Synthesis Examples

| No. | Precursor Compound (e.g., before the addition of a benefit agent) | No. | Pro-Benefit-Agent Compound (e.g., a compound according to Formula 1, not including Comparative Examples A, B, and C) |
|---|---|---|---|
| 1' | (structure) | 1 | (structure) |
| 2' | (structure) | 2 | (structure) |
| 3' | (structure) | 3A | (structure) |
|  |  | 3B | (structure) |
| 4' | (structure) | 4 | (structure) |
| 5' | (structure) | 5 | (structure) |
| 6' | (structure) | 6 | (structure) |

TABLE D-continued
Structural representation of the Synthesis Examples
| No. | Precursor Compound (e.g., before the addition of a benefit agent) | No. | Pro-Benefit-Agent Compound (e.g., a compound according to Formula 1, not including Comparative Examples A, B, and C) |
|---|---|---|---|
| 7' | 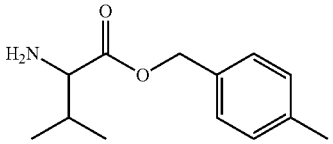 [SMILES: Cc1ccc(COC(=O)C(N)C(C)C)cc1] | 7 | 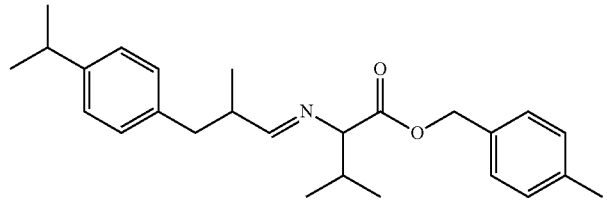 [SMILES: Cc1ccc(COC(=O)C(/N=C/C(C)Cc2ccc(C(C)C)cc2)C(C)C)cc1] |
| 8' | 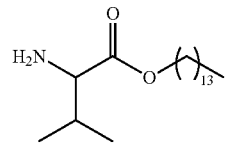 | 8 | 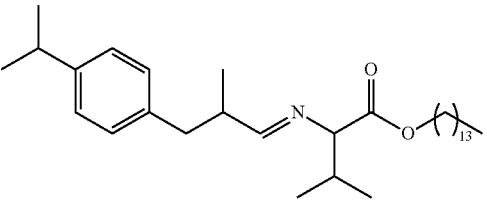 |
| 9' | 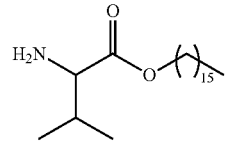 | 9 | 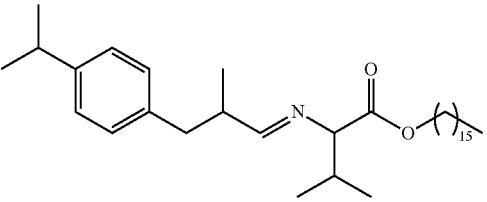 |
| 10' | 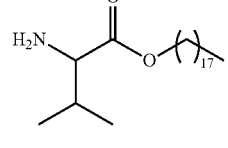 | 10 | 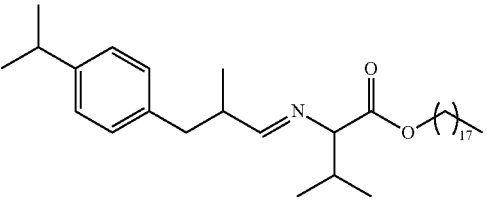 |
| 11' | 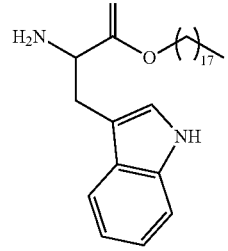 | 11 | 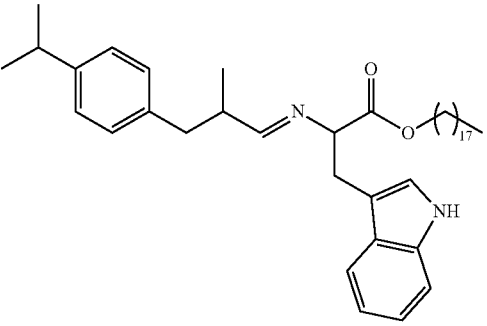 |
| 12' | 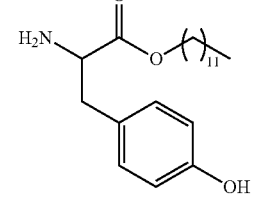 | 12 | 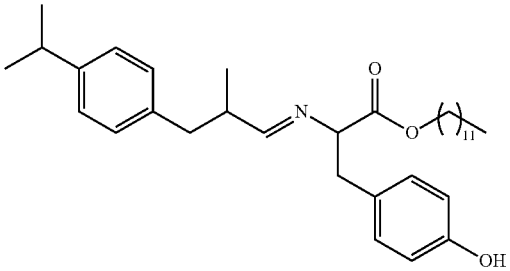 |

TABLE D-continued
Structural representation of the Synthesis Examples
| No. | Precursor Compound (e.g., before the addition of a benefit agent) | No. | Pro-Benefit-Agent Compound (e.g., a compound according to Formula 1, not including Comparative Examples A, B, and C) |
|---|---|---|---|
| 13' | 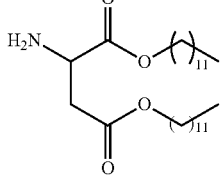 | 13 | 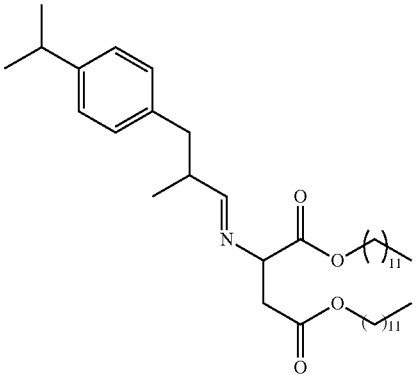 |
| 14' | 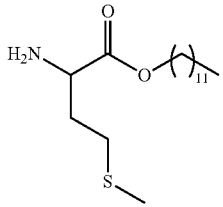 | 14 | 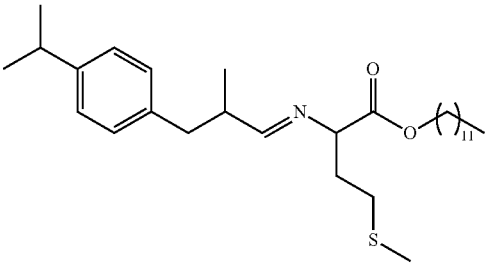 |
| 15' | 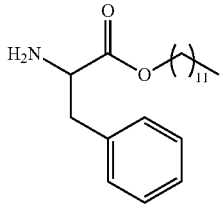 | 15 | 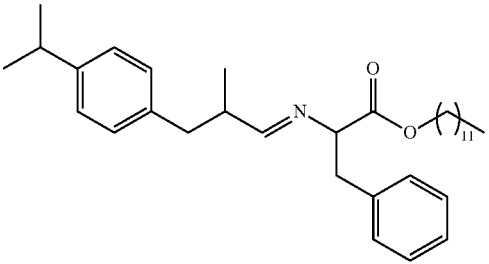 |
| 16' | 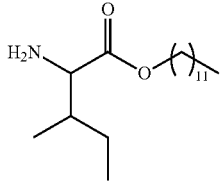 | 16 | 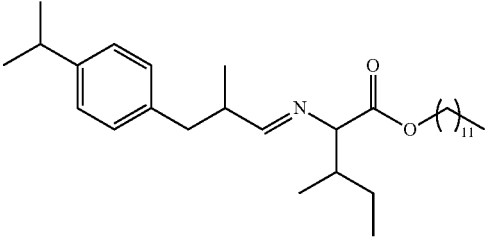 |
| 17' | 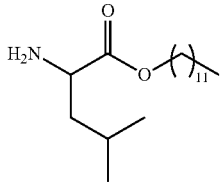 | 17 | 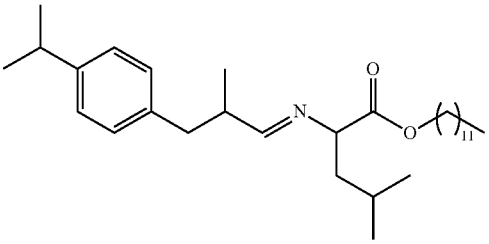 |

TABLE D-continued

Structural representation of the Synthesis Examples

| No. | Precursor Compound (e.g., before the addition of a benefit agent) | No. | Pro-Benefit-Agent Compound (e.g., a compound according to Formula 1, not including Comparative Examples A, B, and C) |
|---|---|---|---|
| 18' | [structure] | 18 | [structure] |
| 19' | [structure] | 19 | [structure] |
| 20' | [structure] R = Neodol 123 | 20 | [structure] R = Neodol 123 |
| 21' | [structure] R = Isalchem 123 | 21 | [structure] R = Isalchem 123 |
| 22' | [structure] | 22 | [structure] |

TABLE D-continued
Structural representation of the Synthesis Examples
| No. | Precursor Compound (e.g., before the addition of a benefit agent) | No. | Pro-Benefit-Agent Compound (e.g., a compound according to Formula 1, not including Comparative Examples A, B, and C) |
|---|---|---|---|
| 23' | 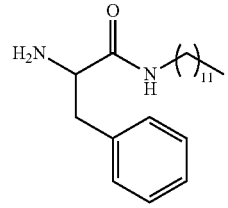 | 23 | |
| 24' | 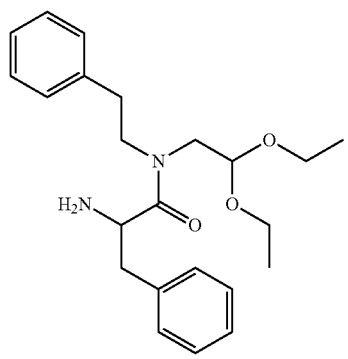 [SMILES: CCOC(CN(CCc1ccccc1)C(=O)C(N)Cc1ccccc1)OCC] | 24 | |
| 25' | 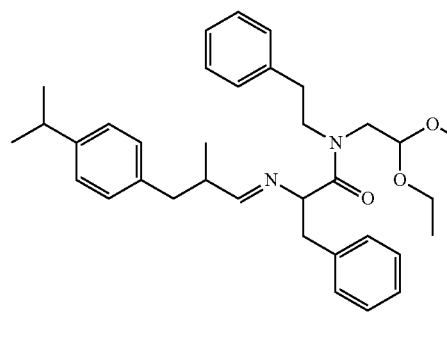 | 25 | |
| 26' | 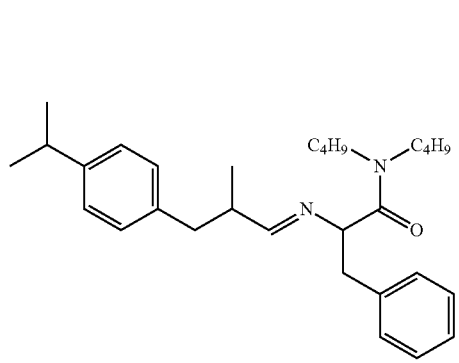 | 26 | |

TABLE D-continued

Structural representation of the Synthesis Examples

| No. | Precursor Compound (e.g., before the addition of a benefit agent) | No. | Pro-Benefit-Agent Compound (e.g., a compound according to Formula 1, not including Comparative Examples A, B, and C) |
|---|---|---|---|
| 27' | prophetic example | 27 | |

In the following Performance Examples and Stability Examples, pro-benefit-agent precursor compounds (e.g., amino acid ester molecules) and the indicated perfume raw materials are mixed substantially following a procedure aligned with the method found in the Test Methods section above ("Preparation of a Premix Fluid"). Despite the different methods of preparation (e.g., made with different PRMs) between the Synthesis Examples and the Performance and Stability Examples, the inputs and outputs, in terms of the pro-benefit-agent compounds, are substantially the same.

Performance Examples

In Performance Examples 1-14 below, treatment compositions comprising neat perfume oil, or pro-benefit-agent compounds according to the present disclosure (e.g., based on modified amino acid esters), or premix emulsions comprising comparative silicone polymers are compared via treatment cycles in an automatic washing machine according to the Fabric Treatment methods provided above. After treatment, the fabrics are tested for Headspace Analysis according to the test methods provided above. The data below shows the benefits afforded by hydrophobically modified amino acid esters, and their interaction with benefit agents through an imine or 1,4-adduct, in delivering benefit agents.

Performance Example 1. Application in Liquid Fabric Enhancers with a Series of Modified Amino Acid Esters To further evaluate these materials, a range of benefit agent materials were examined. In the examples below, equal molar concentrations of aldehydic benefit agents, described in the respective test legs, are provided to a precursor amino acid as describe above, then formulated into a Test Fabric Enhancer/Softener Composition, prepared as provided in the test methods above. Test fabrics are prepared, wash treated, and tested for headspace analysis above the fabrics according to the test methods above.

It is understood that for the rows reading "Synthetic Example 1," etc., both in Table 1 and in subsequent tables, the sample was prepared substantially in accordance with the method and precursor provided in the listed Synthetic Example, but with the benefit agent materials listed in the performance table (in equal molar concentrations to the precursor modified amino acid ester) rather than with just cyclamen aldehyde or delta-damascone, and formulated as a premix fluid as detailed above.

Results of the Headspace Analysis Above Fabrics testing are provided below in Table 1.

TABLE 1

Average headspace concentration of aldehyde benefit agents[a] above fabrics

| Compound | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total Headspace Amount released (nmol/L) |
|---|---|---|---|---|---|
| Neat Raw Materials | 0.341 | 0.199 | 0.245 | 0.039 | 0.824 |
| Synthetic Example 1 | 1.880 | 0.554 | 1.538 | 0.861 | 4.834 |
| Synthetic Example 2 | 2.153 | 5.971 | 3.000 | 4.780 | 15.904 |
| Synthetic Example 3 | 3.184 | 28.842 | 3.380 | 17.578 | 52.984 |

[a]The formulation of the accord is at 0.3 wt % and is composed as follows: 10 wt % Methyl nonyl acetaldehyde, 40 wt % P.T.Bucinal, 20 wt % Precyclemone B, and 30 wt % Floralozone.

As shown in Table 1, the hydrophobically modified amino acid esters 1-3 delivered an improvement in total headspace over neat raw materials.

Furthermore, the materials containing an amino acid side group 2 and 3 showed an increase in total headspace over Synthetic Example 1. Synthetic Example 3, based on the amino acid valine, had the highest total headspace with a more favorable interaction toward sterically encumbered benefit agents, namely Floralozone and Precyclemone B.

Performance Example 2. Comparative Example of a Silicone Pro-Perfume Vs. A Modified Amino Acid Ester This example compares the relative performance of a pro-benefit-agent compound disclosed herein with an industrially comparable silicone-based pro-perfume; both include a perfume fragment attached by an imine bond.

The tests are run substantially the same as in Performance Example 1, with the benefit agents and Synthetic Examples provided below in Table 2; as with Performance Example 1, it is understood that the pro-fragrance silicone polymers are made with the listed benefit agents rather than with just cyclamen aldehyde and reacted in the form of a premix emulsion as described in the methods above.

Results of the Headspace Analysis Above Fabrics are provided in Table 2.

TABLE 2

Average headspace concentration of aldehyde benefit agents [a] above fabrics

| Compound | Amount of Methyl Nonyl Acetaldehyde Released (nmol/L) | Amount of Floralozone released (nmol/L) | Amount of P.T. Bucinal released (nmol/L) | Amount of Precyclemone B released (nmol/L) | Total Headspace Amount Released (nmol/L) |
|---|---|---|---|---|---|
| Neat Raw Material | 4.704 | 0.450 | 2.339 | 2.110 | 9.604 |
| Comp. Synthetic Example A | 4.837 | 7.424 | 2.851 | 9.419 | 24.530 |
| Synthetic Example 3 | 6.707 | 10.452 | 6.025 | 18.240 | 41.423 |

[a] The formulation of the accord is at 0.2 wt % and is composed as follows: 10 wt % Methyl nonyl acetaldehyde, 40 wt % P.T.Bucinal, 20 wt % Precyclemone B, and 30 wt % Floralozone.

As shown in Table 2, Comparative Synthetic Example A and Synthetic Example 3 delivered a higher total headspace over neat raw material. Both Comparative Synthetic Example A and Synthetic Example 3 are believed to operate via a similar imine mechanism and release the benefit agent by subsequent hydrolysis on fabric. Synthetic Example 3 being composed of natural materials delivers the highest total headspace for the described testing methods.

Performance Example 3. Preferred Structure of Hydrophobes of a Modified Valine Ester in Delivering Benefit Agents To assess the performance influence of the Q group in Formula 1 on delivery of benefit agents, a series of eight-carbon alcohols were attached to a valine amino acid. The test was performed in a similar manner to what was described above in a liquid fabric conditioner form.

The structures and logP values of the hydrophobes/Q groups for each of the tested Synthetic Examples are provided below in Table 3A. The pound sign/hashtag (#) represents the point of attachment to the oxygen of the ester group.

TABLE 3A

| Synthetic Example | Hydrophobe/Q group | LogP of hydrophobe/Q group |
|---|---|---|
| Synthetic Example 4 |  | 3.0 |
| Synthetic Example 5 | 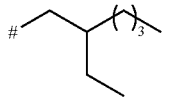 | 2.52 |
| Synthetic Example 6 | 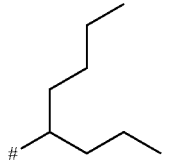 | 2.59 |
| Synthetic Example 7 | 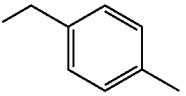 | 1.69 |

Results of the Headspace Analysis Above Fabrics are provided in Tables 3B (at 24-hour time point) and, from an independent test of Synthetic Examples 4 and 7, in Table 3C.

TABLE 3B

Average headspace concentration of aldehyde benefit agents[a] above fabric at 24 h time point

| Compound | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total headspace Amount Released (nmol/L) |
|---|---|---|---|---|---|
| Neat Raw Materials | 5.6325 | 0 | 6.0339 | 0.989 | 12.66 |
| Synthetic Example 4 | 9.4383 | 27.7471 | 12.8209 | 13.9349 | 63.94 |
| Synthetic Example 5 | 9.5197 | 26.8048 | 13.3987 | 12.6218 | 62.35 |
| Synthetic Example 6 | 8.5497 | 8.222 | 10.7483 | 5.2619 | 32.78 |
| Synthetic Example 7 | 5.7185 | 0.1046 | 6.3576 | 0.6972 | 12.88 |

[a] The formulation of the accord is at 0.3 wt % and is composed as follows: 10 wt % Methyl nonyl acetaldehyde, 40 wt % P.T.Bucinal, 20 wt % Precyclemone B, and 30 wt % Floralozone.

TABLE 3C

Average headspace concentration of aldehyde benefit agents[a] above fabric at 72 h time point

| Compound | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total headspace Amount Released (nmol/L) |
|---|---|---|---|---|---|
| Neat Raw Materials | 0.14 | 0.23 | 0.86 | 0.28 | 1.51 |
| Synthetic Example 4 | 0.54 | 0.12 | 1.57 | 7.55 | 9.78 |
| Synthetic Example 7 | 0.21 | 1.19 | 1.06 | 2.61 | 5.07 |

[a]The formulation of the accord is at 0.3 wt % and is composed as follows: 10 wt % Methyl nonyl acetaldehyde, 40 wt % P.T.Bucinal, 20 wt % Precyclemone B, and 30 wt % Floralozone.

This performance test highlights that the structural connectivity of the alcohol hydrophobe significantly influences delivery of benefit agents. The most preferred order based on data exemplified in Table 3B, 24 h headspace time point, is as follows: Synthetic Example 4>Synthetic Example 5>>Synthetic Example 6>>Synthetic Example 7>neat raw materials.

Linear hydrophobes (e.g., Synthetic Example 4) are preferred over branched hydrophobes (Synthetic Examples 5 and/or 6). Furthermore, the terminal alcohol in Synthetic Example 4 is preferred over internal alcohol in Synthetic Example 6. Finally, the aryl-containing hydrophobe in Synthetic Example 7 generally appears to provide a narrow benefit over neat raw materials after 24 hours.

To help exemplify the dynamic range of benefit agent affinity and release longevity obtained by different hydrophobes, a second independent test was conducted and tabulated in Table 3C. The independent test measured headspace at a 72 h time point for Synthetic Examples 4 and 7. Echoing the results in table 3B, there is a preference order of Synthetic Example 4>Synthetic Example 7>neat raw materials. Furthermore, upon examining Synthetic Example 4 showed higher counts of Methyl Nonyl Acetaldehyde, but lower counts of Floralozone than Synthetic Example 7. This may lead to different olfactory experiences in a consumer product. Without wishing to be bound by theory, it is believed that the differences in benefit agent affinity may be partially influenced by structural conformation of the two molecules such as net molecular interaction either through dipole-dipole interactions or potentially aryl-aryl ($\pi$-$\pi$) interactions with the modified amino acid scaffolds.

Performance Example 4. Preferred Hydrophobe Alcohol Chain Length on an Amino Acid Core As illustrated in Performance Example 3, the hydrophobe/Q group in Formula 1 plays a significant role in the delivery efficiency of the benefit agents. Subsequently, the most preferred chain length for the hydrophobe/Q group was investigated with regard to benefit agent delivery. A series of linear alcohols used to make the hydrophobe/Q group were selected as they were the most preferred based on results discussed above. Table 4A shows the number of carbons in the linear hydrophobes for each example.

TABLE 4A

| Example | No. of Carbons in Hydrophobe |
|---|---|
| Comp. Synthetic Example B | 1 |
| Comp. Synthetic Example C | 2 |
| Synthetic Example 4 | 8 |
| Synthetic Example 3 | 12 |
| Synthetic Example 8 | 14 |
| Synthetic Example 9 | 16 |
| Synthetic Example 10 | 18 |

Results of the Headspace Analysis Above Fabrics are provided in Table 4B.

TABLE 4B

Average headspace concentration of aldehyde benefit agents[a] above fabrics

| Compound | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total headspace Amount released (nmol/L) |
|---|---|---|---|---|---|
| Neat Raw Materials | 1.21 | 0.57 | 4.11 | 1.55 | 7.44 |
| Comp. Synthetic Example B | 1.89 | 1.36 | 7.11 | 5.59 | 15.94 |
| Comp. Synthetic Example C | 1.81 | 1.49 | 7.50 | 5.55 | 16.36 |
| Synthetic Example 4 | 5.92 | 0.66 | 13.91 | 53.56 | 74.06 |
| Synthetic Example 3 | 5.57 | 0.80 | 11.94 | 50.00 | 68.31 |
| Synthetic Example 8 | 5.42 | 0.80 | 12.14 | 49.46 | 67.83 |
| Synthetic Example 9 | 5.32 | 0.81 | 12.42 | 47.87 | 66.42 |
| Synthetic Example 10 | 6.28 | 0.79 | 14.25 | 46.99 | 68.31 |

[a] The formulation of the accord is at 0.3 wt % and is composed as follows: 10 wt % Methyl nonyl acetaldehyde, 40 wt % P.T. Bucinal, 20 wt % Precyclemone B, and 30 wt % Floralozone.

As shown in Table 4B, a Q group as defined in Formula 1 with at least eight linear carbon atoms appears to be required to obtain the highest benefit. In the freshly prepared samples, the most preferred carbon lengths are represented by Synthetic Example 3 and Synthetic Example 4. Additionally, each hydrophobe in the eight-to-eighteen carbon range provides performance benefits when compared to the comparative examples B or C (one or two carbons, respectively). Additional internal testing (results not shown here) indicates that adding additional carbon atoms (e.g., twenty or more) do not significantly improve performance; therefore, for mass efficiency reasons, it may be preferred to use up to eighteen carbons in the hydrophobe. Additionally, using hydrophobes with additional carbons (e.g., twenty or more) appear to present processing difficulties, which may require the addition of additional processing aids such as solvents, which bring extra cost without adding additional performance benefits. Although lower carbon scaffolds do provide advantage over neat perfume under the current method, subsequent internal stability studies indicate this modest advantage may be lost upon aging, unlike the longer carbon chain scaffolds.

Performance Example 5. Influence of Amino Acid Side Groups on Imine Formation and Performance Through the Rinse Further experimentation is performed to investigate the influence of the amino acid side group on performance. Various amino acid side groups with different functionality and substituents were selected to investigate most preferred structural variants. The amino acid side groups tested are provided in Table 5A. The pound sign/hashtag (#) represents the point of attachment to the central carbon of the amino acid.

TABLE 5A

| Example | Parent Amino Acid | Side group structure |
| --- | --- | --- |
| Synthetic Example 3 | Valine | 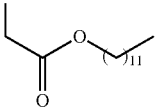 |
| Synthetic Example 11 | Tryptophan | 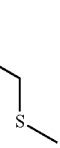 |
| Synthetic Example 12 | Tyrosine |  |

TABLE 5A-continued

| Example | Parent Amino Acid | Side group structure |
| --- | --- | --- |
| Synthetic Example 13 | Aspartic acid (shown with additional C12 hydrophobe) | 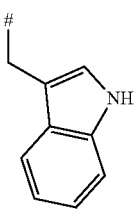 |
| Synthetic Example 14 | Methionine | 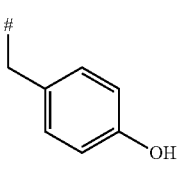 |

Results of the Headspace Analysis Above Fabrics are provided in Table 5B.

TABLE 5B

Average headspace concentration of aldehyde benefit agents [a] above fabrics

| Compound | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total Headspace Amount released (nmol/L) |
| --- | --- | --- | --- | --- | --- |
| Neat Raw Materials | 0.34 | 0.49 | 1.36 | 0.62 | 2.81 |
| Synthetic Example 3 | 2.13 | 14.62 | 4.32 | 15.35 | 36.42 |
| Synthetic Example 11 | 1.17 | 9.79 | 3.24 | 10.77 | 24.96 |
| Synthetic Example 12 | 1.83 | 14.25 | 3.60 | 14.45 | 34.12 |
| Synthetic Example 13 | 1.47 | 14.16 | 3.17 | 14.25 | 33.04 |
| Synthetic Example 14 | 1.61 | 13.28 | 3.72 | 16.00 | 34.60 |

[a] The formulation of the accord is at 0.2 wt % and is composed as follows: 10 wt % Methyl nonyl acetaldehyde, 40 wt % P.T. Bucinal, 20 wt % Precyclemone B, and 30 wt % Floralozone Each of the synthetic examples in Table 5B demonstrates an improved headspace over the neat raw materials. Within the series, Synthetic Example 3, based on Valine, has the highest total headspace.

Interestingly, Synthetic Example 13, which possesses two hydrophobes (one formed at the carboxy end of the amino acid, and another linked to the side group), did not yield an overall improvement over Synthetic Example 3. This would suggest that additional hydrophobes (e.g., more than one) are not required to efficiently deliver the benefit agent.

Furthermore, the ratios between individual benefit agents across synthetic examples are nearly conserved, thereby suggesting that the imine is marginally affected by the amino acid R-group.

Performance Example 6. Selected Survey of Hydrophobic Amino Acid Side Groups on Benefit Delivery in a Liquid Fabric Enhancer Formulation A subsection of hydrophobic amino acids is investigated in their ability to deliver benefit agents. Freshly prepared samples in a liquid fabric enhancer are tested using an accord of benefit agents. The amino acid side groups tested are provided in Table 6A. The pound sign/hashtag (#) represents the point of attachment to the central carbon of the amino acid.

TABLE 6A

| Example | Parent Amino Acid | Side group structure |
|---|---|---|
| Synthetic Example 3 | Valine |  |
| Synthetic Example 15 | Phenylalanine | 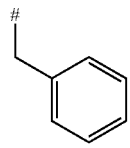 |
| Synthetic Example 16 | Isoleucine |  |

Results of the Headspace Analysis Above Fabrics are provided in Table 6B.

TABLE 6B

Average headspace concentration of aldehyde benefit agents [a] above fabrics

| Compound | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total headspace Amount released (nmol/L) |
|---|---|---|---|---|---|
| Neat Raw Materials | 0.85 | 0.31 | 1.88 | 0.50 | 3.53 |
| Synthetic Example 3 | 2.47 | 20.41 | 8.41 | 39.58 | 70.87 |
| Synthetic Example 15 | 2.55 | 20.92 | 8.91 | 37.05 | 69.42 |
| Synthetic Example 16 | 2.06 | 19.96 | 6.51 | 38.08 | 66.61 |

[a] The formulation of the accord is at 0.3 wt % and is composed as follows: 10 wt % Methyl nonyl acetaldehyde, 40 wt % P.T. Bucinal, 20 wt % Precyclemone B, and 30 wt % Floralozone.

As exemplified in Table 6B, all of the tested synthetic examples yielded an improvement in headspace over the neat raw materials. Of the series, both Synthetic Examples 3 and 15 are somewhat superior to Synthetic Example 16. Similar ratios in individual benefit agents were observed across the synthetic examples.

Performance Example 7. Influence of a Single Carbon Extension of the Amino Acid Side Group on Performance of a Benefit Agent in a Liquid Fabric Enhancer Of interest is the investigation of steric demand on imine formation and the relative performance of such constructs through the rinse. Furthermore, the influence of a single carbon atom can provide insight into the degree of hydrophobicity and deposition aid attributed by the amino acid side group. To investigate this phenomenon, the amino acid cores of Valine and Leucine (containing an extra carbon spacer) are selected as the comparative examples.

The amino acid side groups tested are provided in Table 7A. The pound sign/hashtag (#) represents the point of attachment to the central carbon of the amino acid.

TABLE 7A

| Example | Parent Amino Acid | Side group structure |
|---|---|---|
| Synthetic Example 3 | Valine |  |
| Synthetic Example 17 | Leucine |  |

Results of the Headspace Analysis Above Fabrics are provided in Table 7B.

TABLE 7B

Average headspace concentration of aldehyde benefit agent [a] above fabrics

| Compound | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total Headspace Amount released (nmol/L) |
|---|---|---|---|---|---|
| Neat Raw Materials | 0.01 | 0.09 | 0.28 | 0.06 | 0.44 |
| Synthetic Example 3 | 0.69 | 25.80 | 3.31 | 17.47 | 47.27 |
| Synthetic Example 17 | 0.36 | 23.12 | 2.48 | 16.28 | 42.24 |

[a] The formulation of the accord is at 0.2 wt % and is composed as follows: 10 wt % Methyl nonyl acetaldehyde, 40 wt % P.T. Bucinal, 20 wt % Precyclemone B, and 30 wt % Floralozone In Table 7B, the difference of one carbon atom on the amino acid side group is exemplified. Performance results indicate that both materials deliver a significant benefit over neat raw materials. Furthermore, the smaller side group exhibited in Synthetic Example 3 appears to be preferred over the side group of Synthetic Example 17.

Performance Example 8. Performance Across Various Fabric Types

In addition to the cotton terries exemplified in each of the Performance Examples, there is interest to examine the performance across a series of fabric types that closely represent a consumer wash load. Wash conditions are consistent to what is described in the Methods above, except for using the following fabric load: five 8×8" tracers of each of the following fabric types were used woven cotton terry (100% fiber content), weft knit cotton knit (100% fiber content), plain woven polyester/cotton (65:35 fiber content), weft knit polyester (100% fiber content), woven twill cotton/spandex (98:2 fiber content) and fabrics were purchased from WFK Testgewebe GmbH, Christenfeld 10, D-41379 Brüggen, Deutschland.

Results of the Headspace Analysis Above Fabrics are provided in Table 8A.

TABLE 8A

Average headspace concentration of aldehyde benefit agents [a] above fabrics

| Compound-Fabric Type | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total headspace Amount released (nmol/L) |
|---|---|---|---|---|---|
| Neat Raw Materials-Flat Cotton | 8.85 | 0.60 | 5.24 | 0.69 | 15.38 |
| Neat Raw Materials-Poly Cotton | 1.99 | 0.41 | 2.47 | 0.36 | 5.24 |
| Neat Raw Materials-Polyester | 1.54 | 0.09 | 0.83 | 0.03 | 2.49 |
| Neat Raw Materials-Spandex | 4.24 | 1.68 | 5.15 | 0.98 | 12.05 |
| Neat Raw Materials-Terry | 22.83 | 0.66 | 13.75 | 1.45 | 38.68 |
| Synthetic Example 3-Flat Cotton | 12.29 | 16.43 | 13.18 | 13.70 | 55.60 |
| Synthetic Example 3-Poly Cotton | 2.28 | 6.71 | 4.26 | 4.03 | 17.27 |
| Synthetic Example 3-Polyester | 20.99 | 30.38 | 24.65 | 22.89 | 98.91 |
| Synthetic Example 3-Spandex | 4.53 | 4.97 | 4.58 | 4.19 | 18.27 |
| Synthetic Example 3-Terry | 17.27 | 14.06 | 15.38 | 12.68 | 59.39 |

[a] The formulation of the accord is at 0.3 wt % and is composed as follows: 10 wt % Methyl nonyl acetaldehyde, 40 wt % P.T. Bucinal, 20 wt % Precyclemone B, and 30 wt % Floralozone.

Table 8A, illustrates that the Synthetic Example 3 provides a benefit across each of the fabric types over the neat raw materials. Polyester represented the greatest delta between raw materials and the Synthetic Example 3. Furthermore, the composition of spandex lead to the smallest delta between Synthetic Example 3 and the neat raw material based on total headspace. In a mixed laundry application, we observe a closer to even ratio of distribution of individual benefit agents distributed across the fabrics.

Performance Example 9. Multi-Cycle Benefit of Modified Amino Acid Esters in a Liquid Fabric Enhancer Multi-cycle wash tests are of interest as they represent continuous use of products by the consumer. In this study, fabrics are subjected to multiple wash cycles as described in the Test Methods above and in Performance Example 8, with a 24-hour rest day between each repetitive fabric wash. Pro-benefit-agent compounds, as described below, are included in each cycle as part of a liquid fabric enhancer composition.

Results of the Headspace Analysis Above Fabrics are provided in Table 9A.

TABLE 9A

Average headspace concentration of aldehyde benefit agents [a] above fabrics

| Compound | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total headspace Amount released (nmol/L) |
|---|---|---|---|---|---|
| Synthetic Example 3-Flat Cotton | 12.29 | 16.43 | 13.18 | 13.70 | 55.60 |
| Synthetic Example 3-Poly Cotton | 2.28 | 6.71 | 4.26 | 4.03 | 17.27 |
| Synthetic Example 3-Polyester | 20.99 | 30.38 | 24.65 | 22.89 | 98.91 |
| Synthetic Example 3-Spandex | 4.53 | 4.97 | 4.58 | 4.19 | 18.27 |
| Synthetic Example 3-Terry | 17.27 | 14.06 | 15.38 | 12.68 | 59.39 |
| Synthetic Example 3-3 cycles-Flat Cotton | 10.59 | 13.70 | 10.20 | 12.41 | 46.90 |
| Synthetic Example 3-3 cycles-Poly Cotton | 4.79 | 16.15 | 4.91 | 11.86 | 37.72 |
| Synthetic Example 3-3 cycles-Polyester | 26.32 | 28.56 | 24.10 | 24.84 | 103.82 |
| Synthetic Example 3-3 cycles-Spandex | 9.31 | 6.87 | 8.78 | 6.56 | 31.52 |
| Synthetic Example 3-3 cycles-Terry | 19.28 | 14.76 | 15.68 | 15.69 | 65.42 |

[a] The formulation of the accord is at 0.3 wt % and is composed as follows: 10 wt % Methyl nonyl acetaldehyde, 40 wt % P.T. Bucinal, 20 wt % Precyclemone B, and 30 wt % Floralozone.

A multi-cycle benefit is observed across several fabrics from repetitive treatment with Synthetic Example 3 (see Table 9A). The greatest increases in performance from multi-cycle benefits was observed for poly-cotton and spandex.

Performance Example 10. Application and Benefit of Synthetic Example 1 in a Dry Particle Formulation Initially, esterified glycine is reacted with cyclamen aldehyde as described above leading to Synthetic Example 1. In this example, the formulation of material is prepared in a dry-formed particles application (e.g., a pastille comprising polyethylene glycol as a carrier; similar in size and shape to those sold as DOWNY UNSTOPABLES™ by The Procter & Gamble Company). The formulations of the particles for each leg are provided in Table 10A, where Synthetic Example 1 is introduced as a premix fluid as detailed above. Amounts are provided by % weight of the composition.

TABLE 10A

| Leg | PEG-8000 | Modified Amino Acid Premix Fluid | Neat PRMs |
|---|---|---|---|
| Neat raw materials[a] | 99.34% | 0.00% | 0.66% |
| Synthetic Example 1[a] | 99.11% | 0.89% | 0.00% |

[a] The cumulative raw materials equated 0.66 wt % of Cyclamen Aldehyde in both legs.

In the example below, equal molar concentrations of the perfume raw materials are provided to a Test Fabric Pastille Composition, prepared as provided in the Test Methods above. Test fabrics are prepared, wash treated, and tested for headspace analysis above the fabrics according to the Test Methods above. The performance test results are provided in Table 10B.

TABLE 10B

Average headspace concentration of cyclamen aldehyde[a] above fabrics

| Compound | Amount of cyclamen aldehyde released (nmol/L) [SD] |
|---|---|
| Neat raw materials | 1.54 [0.22] |
| Synthetic Example 1 | 11.31 [1.28] |

[a] The benefit formulation is as follows: 0.66 wt % cyclamen aldehyde.

As shown in Table 10B, the Synthetic Example 1 in a dry particle formulation shows an advantage over the neat raw materials through the rinse and dryer.

Performance Example 11. Performance Evaluation in a Dry Particle Formulation

To investigate the scope of suitable amino acid cores, a series of cyclamen aldehyde materials are formulated into a dry pastille formulation. It is anticipated that certain amino acid side groups may be more preferred than others in deliver a greater quantity of benefit agents in a dry particle formulation. Glycine, alanine, and valine are investigated as the amino acids of the respective cores.

Results of the Headspace Analysis Above Fabrics are provided in Table 11A.

TABLE 11A

Average headspace concentration of cyclamen aldehyde [a] above fabrics

| Compound | Parent Amino Acid | Amount of Cyclamen Aldehyde released (nmol/L) [SD] |
|---|---|---|
| Neat Raw Materials | — | 0.15 [0.04] |
| Synthetic Example 1 | Glycine | 0.99 [0.10] |

TABLE 11A-continued

Average headspace concentration of cyclamen aldehyde [a] above fabrics

| Compound | Parent Amino Acid | Amount of Cyclamen Aldehyde released (nmol/L) [SD] |
|---|---|---|
| Synthetic Example 2 | Alanine | 0.63 [0.17] |
| Synthetic Example 3A | Valine | 0.59 [0.11] |

[a] The perfume formulation is as follows: 0.66 wt % cyclamen aldehyde.

As shown in Table 11A a series of hydrophobically modified amino acid esters are examined in a dry particle form. Each of the materials delivers a greater benefit than the neat raw material. Synthetic Example 1 provides the largest headspace followed by Synthetic Example 2, then Synthetic Example 3.

This trend suggests that amino acid side group selection is less significant when the materials are formulated in a dry form, such as the solid particles tested here, compared to in a liquid/aqueous form; see, for example, Performance Examples 3, 4, 5, and 7 above.

That being said, it is believed that a premix composition may be useful when formulating the materials into a dry form, so that the precursor compound and the benefit agent are able to associate in the liquid.

Additionally, even though it shows slightly less performance in the above table, it is believed that a core based on valine may be preferred for stability reasons, for example due its tendency to remain unpolymerized.

Performance Example 12. Performance Evaluation in a Detergent Composition

A liquid detergent as described in the Test Methods above is combined with a modified amino acid ester that contains δ-Damascone as a benefit agent.

Results of the Headspace Analysis Above Fabrics are provided in Table 12A.

TABLE 12A

Average headspace concentration of δ-Damascone [a] above a fabric

| Compound | Total headspace of δ-Damascone Amount released (nmol/L) |
|---|---|
| Neat Raw Materials | 28.43 |
| Synthetic Example 3B | 40.72 |

[a] The perfume formulation is as follows: 1% δ-Damascone.

The results in Table 12A indicates that Synthetic Example 3B delivers an improvement of benefit agent in headspace over the neat raw materials when used in a liquid laundry detergent.

Performance Example 13. Softening Agent Levels and Performance Benefits

To investigate potential synergistic benefits between a pro-benefit-agent compound according to the present disclosure and a cationic softening agent in a liquid fabric enhancer formulation, the level of cationic softener (a diester quat, namely N,N-di(tallowoyloxyethyl)-N,N-dimethylammonium) is varied. Three different diester quat levels are formulated (4 wt %, 7.3 wt %, and 12 wt %) as described in Preparation of a Test Fabric Enhancer/Softener Composition above.

Results of the Headspace Analysis Above Fabrics are provided in Table 13A.

TABLE 13A

Average headspace concentration of aldehyde benefit agents [a] above fabrics

| Compound | Amt. of diester quat (wt %) | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total Headspace Amount released (nmol/L) |
|---|---|---|---|---|---|---|
| Neat Raw Materials | 7.3% | 0.84 | 0.30 | 2.47 | 0.33 | 3.95 |
| Synthetic Example 3 | 4% | 0.17 | 0.67 | 0.52 | 0.24 | 1.61 |
| Synthetic Example 3 | 7.3% | 3.62 | 20.07 | 7.38 | 9.17 | 40.24 |
| Synthetic Example 3 | 12% | 4.63 | 17.96 | 8.66 | 8.76 | 40.01 |

[a] The formulation of the accord is at 0.2 wt % and is composed as follows: 10 wt % Methyl nonyl acetaldehyde, 40 wt % P. T. Bucinal, 20 wt % Precyclemone B, and 30 wt % Floralozone.

As shown in table 13A, the performance of Synthetic Example 3 is influenced by the concentration of the diester quat. The best performance is obtained when the softening agent is greater than 4% under the described testing conditions.

Performance Example 14. Combinations of Neat Perfume Oils and Pro-Benefit Amino Acid Esters in Delivering Benefit Agents to Fabrics Neat perfume oils are common in fabric treatment compositions. Relationships between perfume oils and the pro-benefit-agent compounds (e.g., modified amino acid esters) are examined at three concentrations ranging from 2% neat oil to 10% neat oil.

The perfume oil is a combination of perfume raw materials that does not contain aldehydes or ketones delivered by the amino-acid-based pro-benefit agent; specifically, the neat perfume oil contains, by weight of the neat perfume oil, 10 wt % Geraniol, 20 wt % Citronellol, 20 wt % Acetophonone, 30 wt % Lemonile, and 20% 1,1-dimethoxydodecane. Notably, the neat perfume oil comprises, among other things, perfume types (e.g., alcohols, nitriles, and/or esters) that may not be conducive to forming, e.g., imine bonds with modified amino acids according to the present disclosure due to the lack of aldehydes and ketones.

Results of the Headspace Analysis Above Fabrics with regard to the aldehydes and/or ketones delivered by the pro-benefit-agent compounds are provided in Table 14A.

TABLE 14A

Average headspace concentration of aldehyde benefit agents $^a$ above fabrics

| Compound | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total Headspace Amount released (nmol/L) |
|---|---|---|---|---|---|
| Neat Materials Only | 0.77 | 0.24 | 2.15 | 0.14 | 3.30 |
| Synthetic Example 3 + 2% perfume oil | 2.64 | 10.78 | 4.33 | 4.41 | 22.17 |
| Synthetic Example 3 + 5% perfume oil | 5.94 | 9.73 | 5.59 | 4.62 | 25.88 |
| Synthetic Example 3 + 10% perfume oil | 9.34 | 6.04 | 6.98 | 3.84 | 26.20 |

$^a$ The formulation of the accord is at 0.2 wt % and is composed as follows: 10 wt % Methyl nonyl acetaldehyde, 40 wt % P.T. Bucinal, 20 wt % Precyclemone B, and 30 wt % Floralozone.

Table 14A exemplifies that continued addition of a neat perfume oil to the fabric softening formulation has a correlation in the amount of benefit agent delivered by Synthetic Example 3. Without wishing to be bound by theory, it is believed that the hydrophobic materials (e.g., the neat perfume oils and the hydrophobically modified amino acids) will tend to associate in the aqueous product matrix and/or the wash liquor, thereby protecting at least some of the pro-benefit-agent compounds from the water, resulting in less hydrolysis and improved stability.

Performance Example 15. Examination of Alcohol Performance from Primary, Secondary and Alkoxylate Alcohols Flexibility in alcohol feed stocks is attractive for commercialization. Furthermore, the chemical reactivity, kinetics of esterification, and hydrolysis of esters is influenced based by structural configuration. An investigation is performed regarding whether a difference in performance was observed between Q groups containing primary, secondary, and alkoxylated alcohols with an average of twelve carbon atoms.

The structures of the hydrophobes/Q groups for each of the tested Synthetic Examples are provided below in Table 15A. The pound sign/hashtag (#) represents the point of attachment to the oxygen of the ester group.

TABLE 15A

| Synthetic Example | Hydrophobe/Q group |
|---|---|
| Synthetic Example 15 | (structure) |
| Synthetic Example 18 | (structure) |
| Synthetic Example 19 | (structure) |

Fabrics are treated with the compositions, and results of the Headspace Analysis Above Fabrics are provided in Table 15B.

TABLE 15B

Average headspace concentration of aldehyde benefit agent $^a$ above fabrics

| Compound | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total Headspace Amount released (nmol/L) |
|---|---|---|---|---|---|
| Neat Raw Materials | 7.38 | 0.09 | 6.41 | 1.04 | 14.92 |
| Synthetic Example 15 | 25.90 | 5.48 | 20.71 | 26.48 | 78.57 |
| Synthetic Example 18 | 25.55 | 5.40 | 19.87 | 34.79 | 85.61 |
| Synthetic Example 19 | 27.96 | 6.69 | 21.08 | 31.11 | 86.83 |

$^a$ The formulation of the accord is at 0.2 wt % and is composed as follows: 10 wt % Methyl nonyl acetaldehyde, 40 wt % P.T. Bucinal, 20 wt % Precyclemone B, and 30 wt % Floralozone The results in Table 15B illustrate the performance across a series of Q group from primary, secondary or alkoxylated alcohol. Each of the synthetic materials provide a benefit over the neat oil. Within the series, Synthetic Example 18 and 19 had improved performance over Synthetic Example 15. Furthermore, without being bound by theory Synthetic Examples 18 and 19 would have improved hydrolytic stability due to being composed of secondary alcohols.

Performance Example 16. Examination of Secondary Amide in Benefit Agent Delivery in a Fabric Enhancer/Softener Composition A Fabric Enhancer/Softener Composition as described in the Test Methods above is combined with a modified amino acid composing a secondary amide that contains 6-Damascone as a benefit agent. Fabrics are treated with the compositions, and results of the Headspace Analysis Above Fabrics are provided in Table 16.

TABLE 16

Average headspace concentration of δ-Damascone [a] above a fabric

| Compound | Total headspace of δ-Damascone Amount released (nmol/L) |
|---|---|
| Neat Raw Materials | 0.25 |
| Synthetic Example 23 | 15.08 |

[a] The perfume formulation is as follows: 0.2% δ-Damascone.

The results in Table 16 indicates that Synthetic Example 23 delivers an improvement of benefit agent in headspace over the neat raw materials when used in a Fabric Enhancer/Softener Composition.

Performance Example 17. Performance Evaluation of a Tertiary Amide in a Fabric Enhancer/Softener Composition A Fabric Enhancer/Softener Composition as described in the Test Methods above is combined with a modified amino acid composing a tertiary amide that contains aldehyde benefit agents. Fabrics are treated with the compositions, and results of the Headspace Analysis Above Fabrics are provided in Table 17.

TABLE 17

Average headspace concentration of aldehyde benefit agent [a] above fabrics

| Compound | Amount of Methyl Nonyl Acetaldehyde released (nmol/L) | Amount of Floralozone released (nmol/L) | Amount of P.T. Bucinal released (nmol/L) | Amount of Precyclemone B released (nmol/L) | Total Headspace Amount released (nmol/L) |
|---|---|---|---|---|---|
| Neat Raw Materials | 1.57 | 0.05 | 2.84 | 1.04 | 5.50 |
| Synthetic Example 24 | 3.76 | 0.67 | 5.62 | 3.98 | 14.03 |

[a] The formulation of the accord is at 0.2 wt % and is composed as follows: 10 wt % Methyl nonyl acetaldehyde, 40 wt % P.T. Bucinal, 20 wt % Precyclemone B, and 30 wt % Floralozone The results in Table 17 indicate that Synthetic Example 23 delivers an improvement of benefit agent in headspace over the neat raw materials when used in a Fabric Enhancer/Softener Composition.

Stability Example

In Stability Example 1, modified amino acid esters premix fluids are formulated into treatment compositions and the color stability is recorded upon storage.

Stability Example 1. Color Stability of Modified Amino Acid Esters

Pro-benefit modified amino acid esters, specifically premixes in fluid forms, and related fabric softener products formed from such premix fluids are prepared. Color measurements of the fabric softener products that include the modified amino acid ester premix fluids of Synthetic Examples 3 are measured as described in Test Methods above. Lower ΔEt values indicate less color change compared to fresh product.

Aldehyde-containing benefit agents are formulated at 0.2 wt % of the overall treatment composition (Aldehyde composition is as follows: 10 wt % Methyl nonyl acetaldehyde, 40 wt % P.T. Bucinal, 20 wt % Precyclemone B, and 30 wt % Floralozone). As with previous examples, it is understood that the Synthetic Examples are made with the listed aldehydes rather than just cyclamen aldehyde or 6-Damascone, and reacted with the benefit agents in the form of a premix fluid as detailed above. Comparative compositions are made with a KF-8003 silicone premix emulsion and the same aldehydes as described above (e.g., Comparative Example A).

Color stability of the fabric softener products upon storage for four weeks is assessed by the Color Change of a Composition test method provided above. The results are provided in Table 1S below.

TABLE 1S

Average (ΔE$_t$[a]) absorption change upon storing for 4 weeks.

| Compound | ΔE$_t$ [L*, a*, b*]] Temperature storage at 40° C. | ΔE$_t$ [L*, a*, b*]] Temperature storage at 5° C. | [L*, a*, b*]] Fresh Sample |
|---|---|---|---|
| Neat Raw Materials | 9.55 [76.83, −3.96, −1.15] | 3.18 [82.2, −3.79, 4.72] | [85.21, −3.94, 5.72] |
| Comp. Synthetic | 9.65 [81.82, −4.01, 14.38] | 2.14 [85.82, −3.68, 8.01] | [87.2, −3.69, 6.38] |

TABLE 1S-continued

Average ($\Delta E_t^a$) absorption change upon storing for 4 weeks.

| Compound | $\Delta E_t$ [L*, a*, b*]] Temperature storage at 40° C. | $\Delta E_t$ [L*, a*, b*]] Temperature storage at 5° C. | [L*, a*, b*]] Fresh Sample |
|---|---|---|---|
| Example A Synthetic Example 3 | 7.28 [77.93, −4.16, 4.01] | 2.47 [82.68, −3.60, 4.95] | [84.98, −3.91, 5.8] |

$^a\Delta E_t$ is calculated as defined in test methods.

As shown in Table 1S, a product formulated with Synthetic Example 3, which contains a modified amino acid ester in combination with the benefit agent fragment, demonstrates relatively lower $\Delta E_t$, indicating that there is relatively less color change, compared to a product formed with neat raw materials.

Further, a product formulated with Synthetic Example 3 demonstrates relatively lower $\Delta Et$ after storage at 40° C. compared to the product formulated with the imine-containing silicone Competitive Synthetic Example A. Without wishing to be bound by theory, it is believed that the constructed imine in Synthetic Example 3 reduces the overall intensity from the benefit agent residues. Additionally or alternatively, it is believed the nature of bonding in the exemplified modified amino acid esters, resulting in Synthetic Examples 3 having improved color stability with time, may be in part due to reduced gelling compared to the gelling that may be more prevalent in Comparative Synthetic Example A.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A pro-benefit-agent compound, wherein the compound is characterized by a structure according to Formula II:

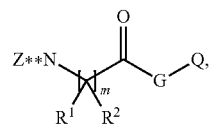

Formula II wherein G is selected from —O—, —S—, or —N(R$^3$)—, wherein R$^3$, if present, is selected from —H or a monovalent moiety with a molecular weight of from about 15 to about 142 Da;

wherein Q is a hydrophobic moiety that comprises 5 to 34 chain atoms and is a monovalent organic group;

wherein the index m is from one to six;

wherein R$^1$ and R$^2$ are independently selected from —H or a monovalent moiety with a molecular weight of from about 15 to about 1000 Da;

wherein Z is a benefit agent fragment of a benefit agent that comprises an aldehyde moiety, a ketone moiety, or combinations thereof;

wherein  represents a linking bond between the nitrogen atom and a carbon atom of the Z group, wherein the linking bond is one of (a) a double bond, thereby forming an imine bond, or (b) a single bond formed from a 1,4-addition when the benefit agent from which the benefit agent fragment is derived comprises an alpha-beta unsaturated carbonyl-containing moiety that is an aldehyde moiety or a ketone moiety, wherein when  represents a single bond, the nitrogen atom is further bonded to a hydrogen (—H);

wherein when the linking bond cleaves, the benefit agent is released.

2. The pro-benefit-agent compound according to claim 1, wherein the index m is one.

3. The pro-benefit-agent compound according to claim 1, wherein at least one of R$^1$ and R$^2$ has the structure of a side group of a proteinogenic amino acid or a derivative thereof.

4. The pro-benefit-agent compound according to claim 3, wherein the side group is a side group of a proteinogenic amino acid selected from the group consisting of valine, phenylalanine, leucine, isoleucine, a derivative thereof, or combinations thereof.

5. The pro-benefit-agent compound according to claim 1, wherein G is —O—.

6. The pro-benefit-agent compound according to claim 1, wherein Q comprises from about 8 to about 18 chain atoms.

7. The pro-benefit-agent compound according to claim 1, wherein Q is an unsubstituted organic group, an unbranched organic group, or a combination thereof.

8. The pro-benefit-agent compound according to claim 1, wherein Q comprises a second fragment of a second benefit agent.

9. The pro-benefit-agent compound according to claim 1, wherein the benefit agent fragment is derived from a benefit agent that comprises an aldehyde moiety.

10. The pro-benefit-agent compound according to claim 1, wherein the benefit agent fragment is derived from a benefit agent that is selected from a perfume raw material, an antimicrobial agent, a pesticide, an insect repellent, an anti-fungal agent, a herbicidal agent, a hueing dye, an antioxidant, a non-perfume organoleptic, or a combination thereof.

11. The pro-benefit-agent compound according to claim 10, wherein the benefit agent is a perfume raw material.

12. The pro-benefit-agent compound according to claim 11, wherein the benefit agent is a perfume raw material selected from the group consisting of: methyl nonyl acetaldehyde: benzaldehyde; floralozone; isocyclocitral; triplal (ligustral); precylcemone B; lilial; decyl aldehyde; undecylenic aldehyde; cyclamen homoaldehyde; cyclamen aldehyde; dupical; oncidal; adoxal; melonal; calypsone; anisic aldehyde; heliotropin; cuminic aldehyde; scentenal; 3,6-dimethylcyclohex-3-ene-1-carbaldehyde; satinaldehyde; canthoxal; vanillin; ethyl vanillin; cinnamic aldehyde; cis-4-decenal; trans-4-decenal; cis-7-decenal; undecylenic aldehyde; trans-2-hexenal; trans-2-octenal; 2-undecenal; 2,4-dodecadeienal; cis-4-heptenal; Florydral;; butyl cinnamaldehyde; limonelal; amyl cinnamaldehyde; hexyl cinnamaldehyde; citronellal; citral; cis-3-hexen-1-al; nerolione; 4-(4-methoxyphenyl) butan-2-one; 1-naphthalen-2-ylethanone; nectaryl; trimofix O; fleuramone; delta-damascone; beta-damascone; alpha-damascone; methyl ionone; 2-hexylcyclopent-2-en-1-one; galbascone; and mixtures thereof.

13. The pro-benefit-agent compound according to claim 1, wherein the benefit agent fragment is derived from a benefit agent that is an antimicrobial agent.

14. The pro-benefit-agent compound according to any preceding claim, wherein:
G=—O—;
m=1;
$R^1$ is a side group of a proteinogenic amino acid;
$R^2$ is —H;
Z is a fragment of a perfume raw material; and
Q is an organic group comprising from about 8 to about 18 chain atoms, preferably wherein the chain atoms are carbon atoms.

15. A treatment composition comprising an adjunct ingredient and the pro-benefit-agent compound according to claim 1,
wherein the treatment composition is a consumer product.

16. The treatment composition according to claim 15, wherein the adjunct ingredient comprise one or more of the following: surfactants, conditioning actives, deposition aids, rheology modifiers or structurants, antioxidants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, perfume delivery systems, structure elasticizing agents, carriers, hydrotropes, processing aids, anti-agglomeration agents, coatings, formaldehyde scavengers, and/or pigments.

17. The treatment composition according to claim 15, wherein the adjunct ingredient comprises a conditioning active.

18. The treatment composition according to claim 15, wherein the treatment composition further comprises neat perfume.

19. The treatment composition according to claim 15, wherein the treatment composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam or mousse, a non-woven sheet, or a mixture thereof.

20. The treatment composition according to claim 15, wherein the pro-benefit-agent compound is present in the treatment composition at a level of from about 0.001% to about 30%, by weight of the treatment composition.

21. A method of treating an article or a surface, wherein the method comprises treating the article or surface with a treatment composition according to claim 1, optionally in the presence of water.

* * * * *